United States Patent
Ji et al.

(10) Patent No.: US 12,413,298 B2
(45) Date of Patent: Sep. 9, 2025

(54) BUFFER RELEASE FOR INTER-SATELLITE LINK TRANSITION

(71) Applicant: QUALCOMM Incorporated, San Diego, CA (US)

(72) Inventors: Lianghai Ji, San Diego, CA (US); Liangping Ma, San Diego, CA (US); Jun Ma, San Diego, CA (US); Qiang Wu, San Diego, CA (US); Mohamad Sayed Hassan, Paris (FR); Huilin Xu, Temecula, CA (US); Weimin Duan, San Diego, CA (US); Karthik Anantha Swamy, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 360 days.

(21) Appl. No.: 17/932,951

(22) Filed: Sep. 16, 2022

(65) Prior Publication Data
US 2024/0097780 A1   Mar. 21, 2024

(51) Int. Cl.
*H04B 7/185* (2006.01)

(52) U.S. Cl.
CPC ..... *H04B 7/18558* (2013.01); *H04B 7/18563* (2013.01); *H04B 7/18591* (2013.01)

(58) Field of Classification Search
CPC ............ H04B 7/18558; H04B 7/18563; H04B 7/18591; H04B 7/18541; H04B 7/18521; H04W 36/083; H04W 36/023; H04W 84/005; H04W 88/02
See application file for complete search history.

(56) References Cited

U.S. PATENT DOCUMENTS

| | | | |
|---|---|---|---|
| 2022/0086780 A1* | 3/2022 | Tsai | G01S 19/05 |
| 2022/0191733 A1* | 6/2022 | Ali | H04L 43/16 |
| 2022/0353838 A1* | 11/2022 | Falkenberg | H04W 24/10 |
| 2023/0254851 A1* | 8/2023 | Prasad | H04W 72/1268 |
| | | | 370/316 |

(Continued)

FOREIGN PATENT DOCUMENTS

WO   WO-2022005263 A1   1/2022

OTHER PUBLICATIONS

Al-Hraishawi, Hayder, et al. "Multi-layer space information networks: Access design and softwarization." IEEE Access 9 (2021): 158587-158598. (Year: 2021).*

(Continued)

*Primary Examiner* — Sharad Rampuria
(74) *Attorney, Agent, or Firm* — Harrity & Harrity LLP/QUALCOMM Incorporated

(57) ABSTRACT

Various aspects of the present disclosure generally relate to wireless communication. In some aspects, a wireless communication device may obtain, at an access stratum (AS) layer, an indication of an inter-satellite link (ISL) activation that is to take place at an activation time. The wireless communication device may receive communications. The wireless communication device may buffer the communications in a buffer at the AS layer. The wireless communication device may release the communications from the buffer to an upper protocol layer at a rate of release that is to change between a transition start time and the activation time. Numerous other aspects are described.

32 Claims, 17 Drawing Sheets

(56) References Cited

U.S. PATENT DOCUMENTS

2023/0319822 A1\* 10/2023 Park ..................... H04L 1/0003
370/329
2023/0388952 A1\* 11/2023 Khoshkholgh Dashtaki ...............
H04W 56/0045

OTHER PUBLICATIONS

International Search Report and Written Opinion—PCT/US2023/071950—ISA/EPO—Nov. 29, 2023.
Xiao Mi: "Feasibility Study on Supporting 5G Delay Sensitive Services Allowing Satellite Access", 3GPP TSG-SA WG1 Meeting #91-e, E-meeting, S1-203177, 3rd Generation Partnership Project (3GPP), Mobile Competence Centre, 650, Route Des Lucioles, F-06921 Sophia-Antipolis Cedex, France vol. SA WG1, No. E-meeting, Aug. 24, 2020-Sep. 2, 2020, Sep. 7, 2020, 9 Pages, XP052453853, p. 1-p. 8.
Yang J., et al., "Enhancing the Resilience of Low Earth Orbit Remote Sensing Satellite Networks", IEEE Network, IEEE Service Center, New York, NY, US, vol. 34, No. 4, Mar. 3, 2020, pp. 304-311, XP011800380, pp. 1-8, Figures 1-4, p. 6-p. 7, Figure 3.
3GPP TR 38.821: "3rd Generation Partnership Project, Technical Specification Group Radio Access Network, Solutions for NR to support non-terrestrial networks (NTN) (Release 16)", V16.1.0, May 2021, pp. 1-140, section 5.

\* cited by examiner

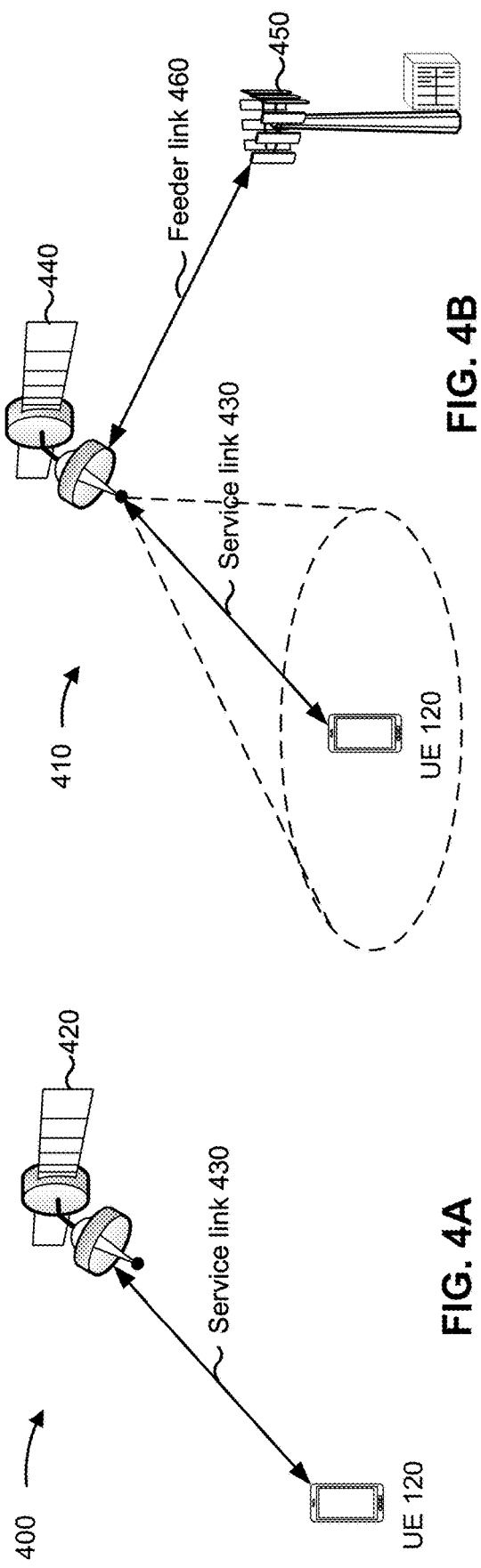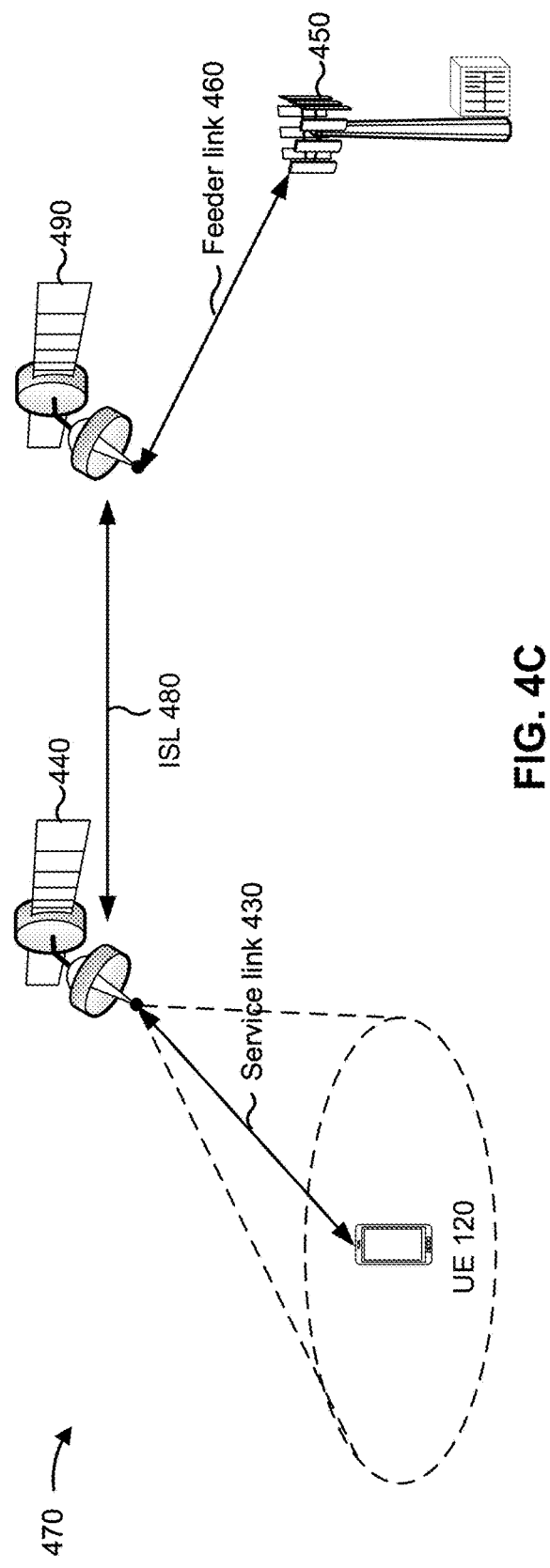
FIG. 4A
FIG. 4B
FIG. 4C

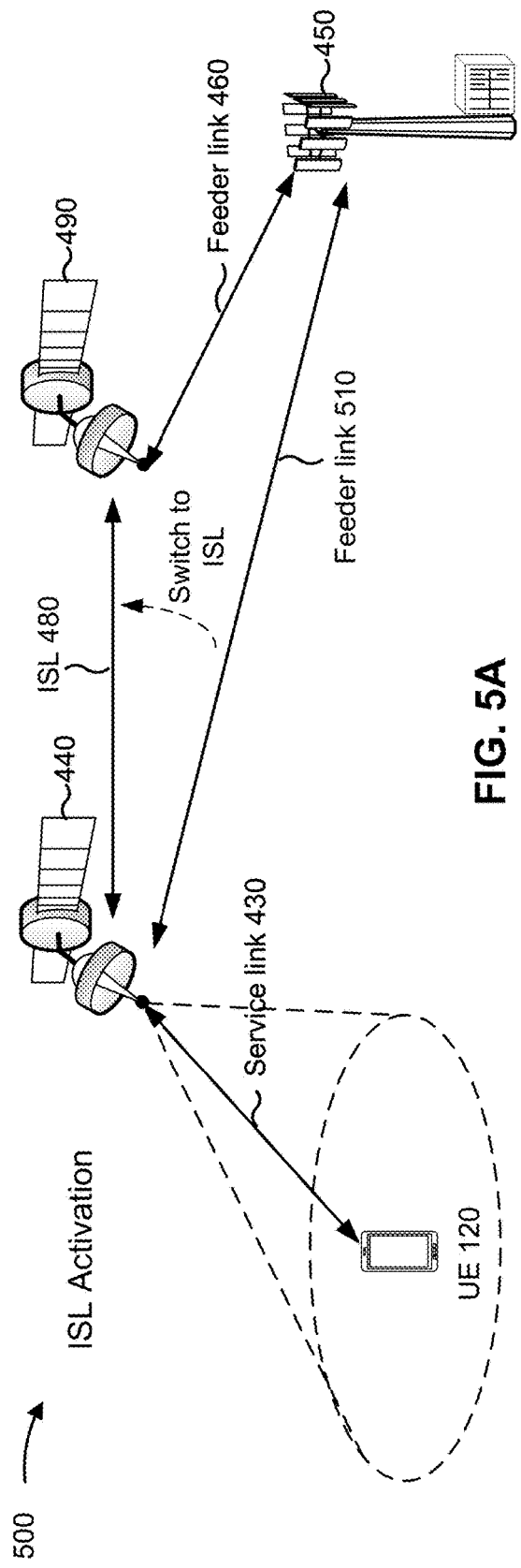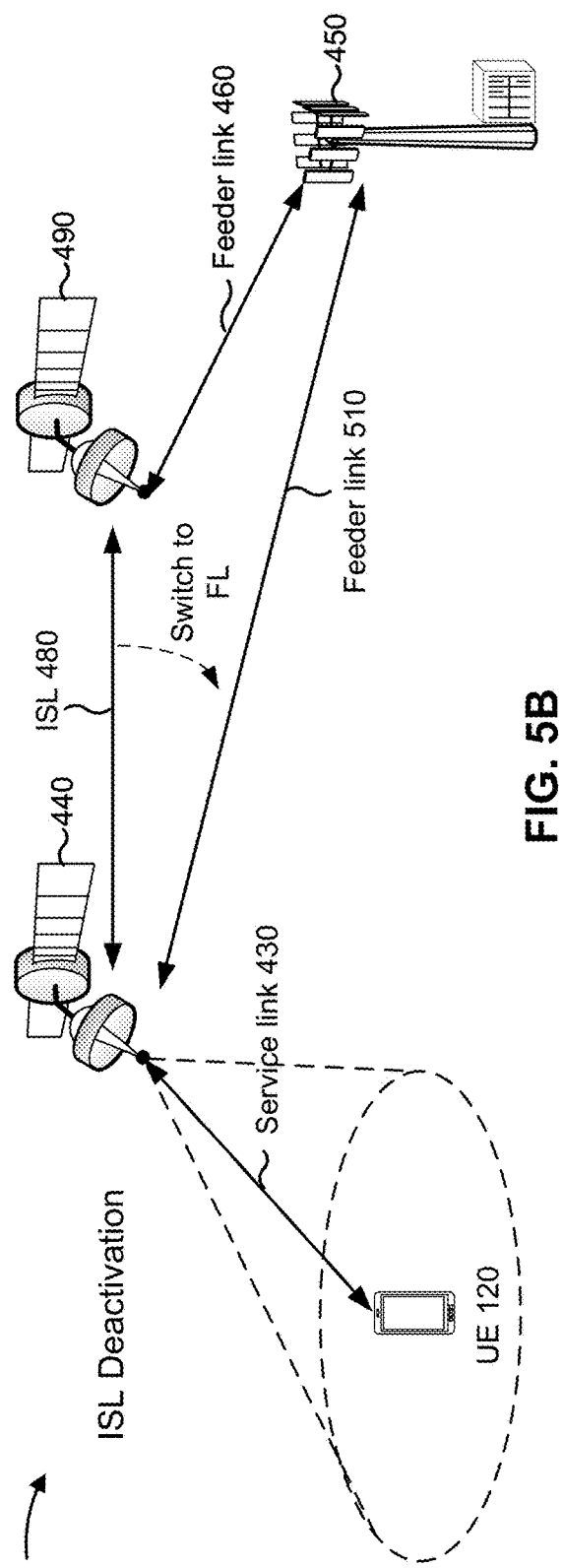

BUFFER RELEASE FOR INTER-SATELLITE LINK TRANSITION

INTRODUCTION

Aspects of the present disclosure generally relate to wireless communication and to techniques and apparatuses for communications involving an inter-satellite link.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a wireless communication device. The method may include obtaining, at an access stratum (AS) layer, an indication of an inter-satellite link (ISL) activation that is to take place at an activation time. The method may include receiving communications. The method may include buffering the communications in a buffer at the AS layer. The method may include releasing the communications from the buffer to an upper protocol layer at a rate of release that changes between a transition start time and the activation time.

Some aspects described herein relate to a method of wireless communication performed by a user equipment (UE). The method may include obtaining, at an AS layer, an indication of an ISL deactivation that is to take place at a deactivation time. The method may include buffering communications in a buffer. The method may include releasing the communications from the buffer at a rate of release that changes between the deactivation time and a transition end time. The method may include transmitting the communications.

Some aspects described herein relate to a wireless communication device for wireless communication. The wireless communication device may include a memory and one or more processors coupled to the memory. The one or more processors may be configured to obtain, at an AS layer, an indication of an ISL activation that is to take place at an activation time. The one or more processors may be configured to receive communications. The one or more processors may be configured to buffer the communications in a buffer at the AS layer. The one or more processors may be configured to release the communications from the buffer to an upper protocol layer at a rate of release that is to change between a transition start time and the activation time.

Some aspects described herein relate to a UE for wireless communication. The UE may include a memory and one or more processors coupled to the memory. The one or more processors may be configured to obtain, at an AS layer, an indication of an ISL deactivation that is to take place at a deactivation time. The one or more processors may be configured to buffer communications in a buffer. The one or more processors may be configured to release the communications from the buffer at a rate of release that is to change between the deactivation time and a transition end time. The one or more processors may be configured to transmit the communications.

Some aspects described herein relate to a non-transitory computer-readable medium that stores a set of instructions for wireless communication by a wireless communication device. The set of instructions, when executed by one or more processors of the wireless communication device, may cause the wireless communication device to obtain, at an AS layer, an indication of an ISL activation that is to take place at an activation time. The set of instructions, when executed by one or more processors of the wireless communication device, may cause the wireless communication device to receive communications. The set of instructions, when executed by one or more processors of the wireless communication device, may cause the wireless communication device to buffer the communications in a buffer at the AS layer. The set of instructions, when executed by one or more processors of the wireless communication device, may cause the wireless communication device to release the communications from the buffer to an upper protocol layer at a rate of release that is to change between a transition start time and the activation time.

Some aspects described herein relate to a non-transitory computer-readable medium that stores a set of instructions for wireless communication by a UE. The set of instructions, when executed by one or more processors of the UE, may cause the UE to obtain, at an AS layer, an indication of an ISL deactivation that is to take place at a deactivation time.

The set of instructions, when executed by one or more processors of the UE, may cause the UE to buffer communications in a buffer. The set of instructions, when executed by one or more processors of the UE, may cause the UE to release the communications from the buffer at a rate of release that is to change between the deactivation time and a transition end time. The set of instructions, when executed by one or more processors of the UE, may cause the UE to transmit the communications.

Some aspects described herein relate to an apparatus for wireless communication. The apparatus may include means for obtaining, at an AS layer, an indication of an ISL activation that is to take place at an activation time. The apparatus may include means for receiving communications. The apparatus may include means for buffering the communications in a buffer at the AS layer. The apparatus may include means for releasing the communications from the buffer to an upper protocol layer at a rate of release that changes between a transition start time and the activation time.

Some aspects described herein relate to an apparatus for wireless communication. The apparatus may include means for obtaining, at an AS layer, an indication of an ISL deactivation that is to take place at a deactivation time. The apparatus may include means for buffering communications in a buffer. The apparatus may include means for releasing the communications from the buffer at a rate of release that changes between the deactivation time and a transition end time. The apparatus may include means for transmitting the communications.

Aspects generally include a method, apparatus, system, computer program product, non-transitory computer-readable medium, UE, base station, network entity, non-terrestrial network (NTN) entity, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 4A-4C are diagrams illustrating examples of satellite deployments in a non-terrestrial network, in accordance with the present disclosure.

FIG. 5A is a diagram illustrating an example of inter-satellite link (ISL) activation, in accordance with the present disclosure.

FIG. 5B is a diagram illustrating an example ISL deactivation, in accordance with the present disclosure.

DETAILED DESCRIPTION

Figure 1:
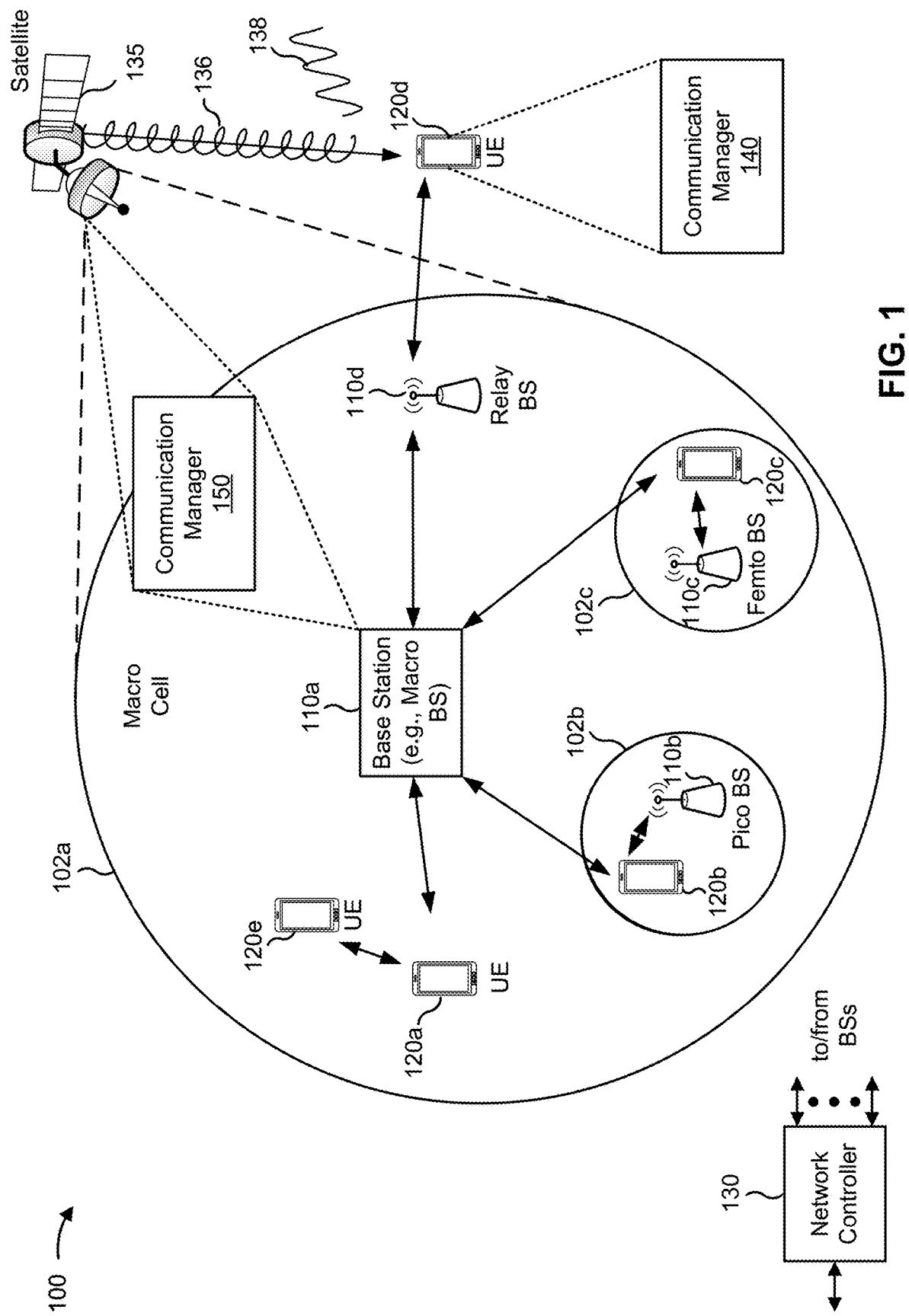
FIG. 1 is a diagram illustrating an example of a wireless network, in accordance with the present disclosure.

A user equipment (UE) may communicate with a network entity (e.g., base station, gateway) using one or more satellites, an unmanned aerial vehicle (UAV), or a high altitude platform station (HAPS). According to one or more examples, a satellite may include a network entity. In some examples, the satellite may be referred to as a non-terrestrial base station, a regenerative repeater, an on-board processing repeater, and/or a non-terrestrial network (NTN) entity. A UE may be stationary or mobile and may be served by a satellite via a service link. The service link may include a link between the satellite and the UE and may include one or more of an uplink or a downlink. The satellite may relay a signal received from a gateway (e.g., ground station) via a feeder link. The feeder link may include a link between the satellite and the gateway and may include one or more of an uplink or a downlink.

An inter-satellite link (ISL), or a link between satellites, may be used to support coverage extension in the NTN (network involving a non-terrestrial entity). For instance, in one example, if a gateway is deployed with certain limitations and a first satellite does not have a direct feeder link connection to the gateway, a second satellite having a feeder link may be communicatively connected to the first satellite with the ISL. In this way, the first satellite has access to the feeder link and service availability improves.

In an example, when the current feeder link of the first satellite deteriorates (e.g., the signal propagation distance increases and/or the radio condition deteriorates), the first satellite may apply an ISL to connect with the second satellite. The second satellite may utilize its feeder link connection and the ISL to facilitate the communication between the first satellite and the network (e.g., the gateway). According to one or more examples, the procedure to switch the first satellite's connection by applying the ISL may be referred to as an "ISL activation" for the first satellite. The ISL activation may help to improve the connectivity between the first satellite and the network. As another example, when the feeder link of the first satellite improves (e.g., the propagation distance decreases and/or the radio condition improves), the first satellite may switch off the ISL and/or disconnect from the second satellite. The first satellite may apply the feeder link to communicate with the network without traffic of the first satellite passing through the second satellite. According to one or more examples, the procedure to disconnect from the second satellite and apply a feeder link connection with the network may be referred to as an "ISL deactivation" for the first satellite. The ISL deactivation may reduce the signal propagation distance and/or the signal propagation trip time between the first satellite and the network.

In some examples, a satellite may be in a geostationary orbit (GSO) or geosynchronous equatorial orbit (GEO), which may be, for example, 36,000 kilometers (km) above the Earth. The speed of the satellite with respect to Earth may be negligible but may have a round-trip propagation delay of more than 500 milliseconds (ms), as compared to 25 ms for a low Earth orbit (LEO) satellite at 600 km above the Earth or 100 ms for a medium Earth orbit (MEO) satellite. In an NTN, where a distance between UE 120 and a satellite can be larger than 600 km changes in a path loss of a signal may not directly correspond to changes in a propagation distance of the signal. In addition, a satellite may not be always available to the UE 120 if the satellite is in a non-geostationary orbit (NGSO) because the satellite may move where there is no line of sight.

In another example, the first satellite may have a feeder link, but a topology change event may occur where there is a change in a communication path in the NTN topology (how communication links are arranged among communicating entities). This may include a change in which communication link is used or a change in an operation of an NTN entity (e.g., activation, deactivation, no line of sight, out of range). In an example, the topology change event may be an ISL activation, where the first satellite no longer uses the feeder link between the first satellite and the gateway and switches to use of the ISL between the first satellite and the second satellite, which in turn may use a respective feeder link to the gateway. A topology change event may also include an ISL deactivation, where the first satellite switches from using the ISL to using the feeder link.

According to one or more examples, when an ISL is activated or deactivated, the signal propagation delay between the UE and the gateway changes because the time for signal propagation through one satellite is shorter than the time for signal propagation through two satellites separated by a significant distance. Accordingly, the communication service will experience a sudden change in latency. The amount of latency change is related to the propagation delay change. The sudden change in latency, if large, can impact the UE's communication service because the UE's communication service may not be aware of the reason for such a sudden change. Even smaller changes in latency can affect the UE's communication service if sudden. The sudden change in latency may cause unexpected communication service behavior, such as a communication service timeout, triggering of a congestion control algorithm, or change in the quality of the communication service experience.

The UE may obtain, at an access stratum (AS) layer (e.g., physical protocol layer), an indication of an ISL activation that is to take place at an activation time or an ISL deactivation that is to take place at a deactivation time. According to various aspects described herein, instead of an immediate change in the propagation delay, a UE may gradually increase or decrease the latency between a first propagation delay before a topology change event (e.g., satellite switch, activation of ISL, deactivation of ISL) and/or a second propagation delay after the topology change event. This may include changing a rate of release of communications from a buffer of the UE so that the change in the propagation delay experienced by a service application of the UE transitions gradually from the first propagation delay to the second propagation delay, rather than changes instantly. The buffer may be storage that buffers communications (stores for later release or temporarily stores). For the UE receiving communications in association with an ISL activation, the UE may buffer received communications and release the communications from the buffer at the AS layer to an upper protocol layer (e.g., layer above the AS layer, application layer for an application providing a service) at a rate of release that changes between a transition start time and the ISL activation time. The transition start time may be an estimated time to start changing the rate of release. For the UE transmitting communications in association with an ISL deactivation, the UE may release the communications from the buffer at a rate of release that changes between an ISL deactivation time and a transition end time. The transition end time may be an estimated time to stop changing the rate of release. For example, the rate of release may change based at least in part on a configured function (e.g., linear function, stepped function, non-linear function). In this way, the UE may avoid sudden changes in latency and thus avoid communication timeouts, the triggering of traffic congestion algorithms, unexpected changes in the communication experience, or other results that may drop service due to sudden changes in latency or consume additional resources when reconnecting the service. As a result, the UE may reduce latency and conserve processing resources and signaling resources.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include a UE 120 or multiple UEs 120 (shown as a UE 120a, a UE 120b, a UE 120c, a UE 120d, and a UE 120e). The wireless network 100 may also include one or more network entities, such as base stations 110 (shown as a BS 110a, a BS 110b, a BS 110c, and a BS 110d), and/or other network entities. A base station 110 is a network entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network entities in the wireless network 100 through various types of backhaul interfaces, such as a direct physical connection or a virtual network, using any suitable transport network.

In some aspects, the term "base station" (e.g., the base station 110) or "network entity" may refer to an aggregated base station, a disaggregated base station, an integrated access and backhaul (IAB) node, a relay node, and/or one or more components thereof. For example, in some aspects, "base station" or "network entity" may refer to a central unit (CU), a distributed unit (DU), a radio unit (RU), a Near-Real Time (Near-RT) RAN Intelligent Controller (MC), or a Non-Real Time (Non-RT) RIC, or a combination thereof. In some aspects, the term "base station" or "network entity" may refer to one device configured to perform one or more functions, such as those described herein in connection with the base station 110. In some aspects, the term "base station" or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station" or "network entity" may refer to any one or more of those different devices. In some aspects, the term "base station" or "network entity" may refer to one or more virtual base stations and/or one or more virtual base station functions. For example, in some aspects, two or more base station functions may be instantiated on a single device. In some aspects, the term "base station" or "network entity" may refer to one of the base station functions and not another. In this way, a single device may include more than one base station.

The wireless network 100 may include one or more relay stations. A relay station is a network entity that can receive a transmission of data from an upstream station (e.g., a network entity or a UE 120) and send a transmission of the data to a downstream station (e.g., a UE 120 or a network entity). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network with network entities that include different types of BSs, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set network entities and may provide coordination and control for these network entities. The network controller 130 may communicate with the base stations 110 via a backhaul communication link. The network entities may communicate with one another directly or indirectly via a wireless or wireline backhaul communication link.

In some aspects, as shown, a cell may be provided by a network entity (e.g., base station 110) of an NTN. As used herein, "non-terrestrial network" may refer to a network for which access is provided by a non-terrestrial base station, such as a base station carried by a satellite, a balloon, a dirigible, an airplane, an unmanned aerial vehicle, and/or a high altitude platform station. A network entity in an NTN (NTN entity) may use a polarization. For example, a network entity in a satellite 135 (NTN entity) may transmit a communication to the UE 120 using a circular polarization 136 or a linear polarization 138. Circular polarization occurs when the tip of the electric field of an electromagnetic wave at a fixed point in space traces a circle, and the electromagnetic wave may be formed by superposing two orthogonal linearly polarized waves of equal amplitude and a 90-degree phase difference. A circular polarization may be a right-hand circular polarization (RHCP) or a left-hand circular polarization (LHCP). Linear polarization occurs when the tip of the electric field of an electromagnetic wave at a fixed point in space oscillates along a straight line over time.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network entity, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network entity as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a wireless communication device (e.g., UE 120, network entity) may include a communication manager 140 or 150. As described in more detail elsewhere herein, the communication manager 140 or 150 may obtain, at an AS layer, an indication of an ISL activation that is to take place at an activation time. The communication manager 140 or 150 may receive communications and buffer the communications in a buffer at the AS layer. The communication manager 140 or 150 may release the communications from the buffer to an upper protocol layer at a rate of release that is to change between a transition start time and the activation time. Additionally, or alternatively, the communication manager 140 or 150 may perform one or more other operations described herein.

In some aspects, the UE 120 may include a communication manager 140. As described in more detail elsewhere herein, the communication manager 140 may obtain, at an AS layer, an indication of an ISL deactivation that is to take place at a deactivation time. The communication manager 140 may buffer communications in a buffer and release the communications from the buffer at a rate of release that is to change between the deactivation time and a transition end time; and transmit the communications. Additionally, or alternatively, the communication manager 140 may perform one or more other operations described herein.

As indicated above, FIG. 1 is provided as an example. Other examples may differ from what is described with regard to FIG. 1.

Figure 2:
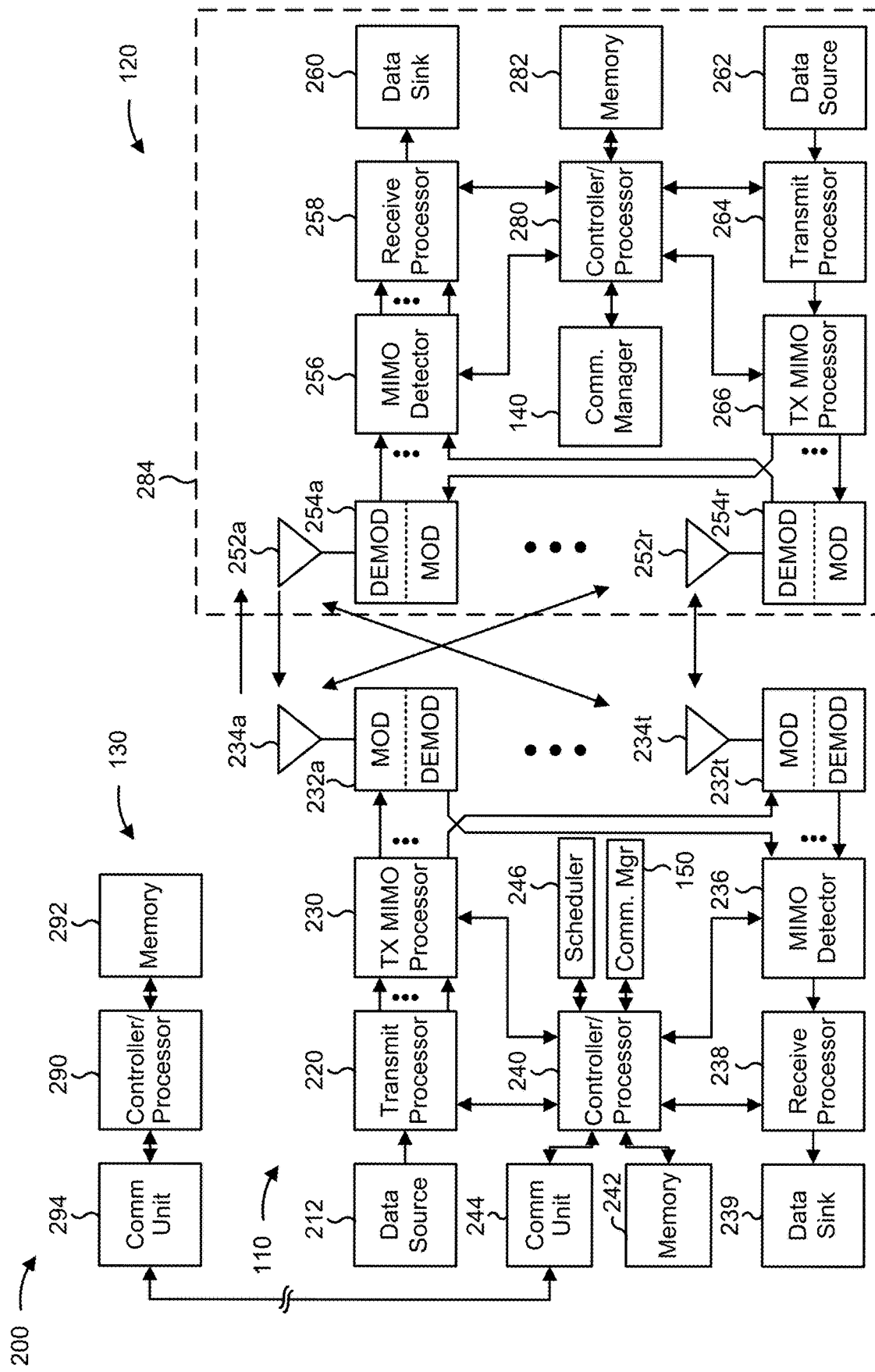
FIG. 2 is a diagram illustrating an example of a network entity (e.g., base station) in communication with a user equipment (UE) in a wireless network, in accordance with the present disclosure.

FIG. 2 is a diagram illustrating an example 200 of a network entity (e.g., base station 110) in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t. The base station 110 may be an NTN network entity located in a terrestrial location or in a non-terrestrial location (e.g., satellite 135).

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network entity via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network entity. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-17).

At the network entity (e.g., base station 110), the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network entity may include a communication unit 244 and may communicate with the network controller 130 via the communication unit 244. The network entity may include a scheduler 246 to schedule one or more UEs 120 for downlink and/or uplink communications. In some examples, the modem 232 of the network entity may include a modulator and a demodulator. In some examples, the network entity includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-17).

A controller/processor of a network entity, (e.g., the controller/processor 240 of the base station 110), the controller/processor 280 of the UE 120, and/or any other component(s) of FIG. 2 may perform one or more techniques associated with a gradual rate of release for a buffer in association with an ISL transition, as described in more detail elsewhere herein. In some aspects, the NTN entity is a network entity at the surface or at a satellite (e.g., satellite 135). For example, the controller/processor 240 of the base station 110, the controller/processor 280 of the UE 120, and/or any other component(s) of FIG. 2 may perform or direct operations of, for example, process 1000 of FIG. 10, process 1100 of FIG. 11, and/or other processes as described herein. The memory 242 and the memory 282 may store data and program codes for the network entity and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network entity and/or the UE 120, may cause the one or more processors, the UE 120, and/or the network entity to perform or direct operations of, for example, process 1000 of FIG. 10, process 1100 of FIG. 11, and/or other processes as described herein. In some examples, executing instructions may include running the instructions, converting the instructions, compiling the instructions, and/or interpreting the instructions, among other examples.

In some aspects, a wireless communication device (e.g., UE 120, network entity) includes means for obtaining, at an AS layer, an indication of an ISL activation that is to take place at an activation time; means for receiving communications; means for buffering the communications in a buffer at the AS layer; and/or means for releasing the communications from the buffer to an upper protocol layer at a rate of release that changes between a transition start time and the activation time. In some aspects, the means for the wireless communication device to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246. In some aspects, the means for the wireless communication device to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the UE 120 includes means for obtaining, at an AS layer, an indication of an ISL deactivation that is to take place at a deactivation time; means for buffering communications in a buffer; means for releasing the communications from the buffer at a rate of release that changes between the deactivation time and a transition end time; and/or means for transmitting the communications. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

As indicated above, FIG. 2 is provided as an example. Other examples may differ from what is described with regard to FIG. 2.

Figure 3:
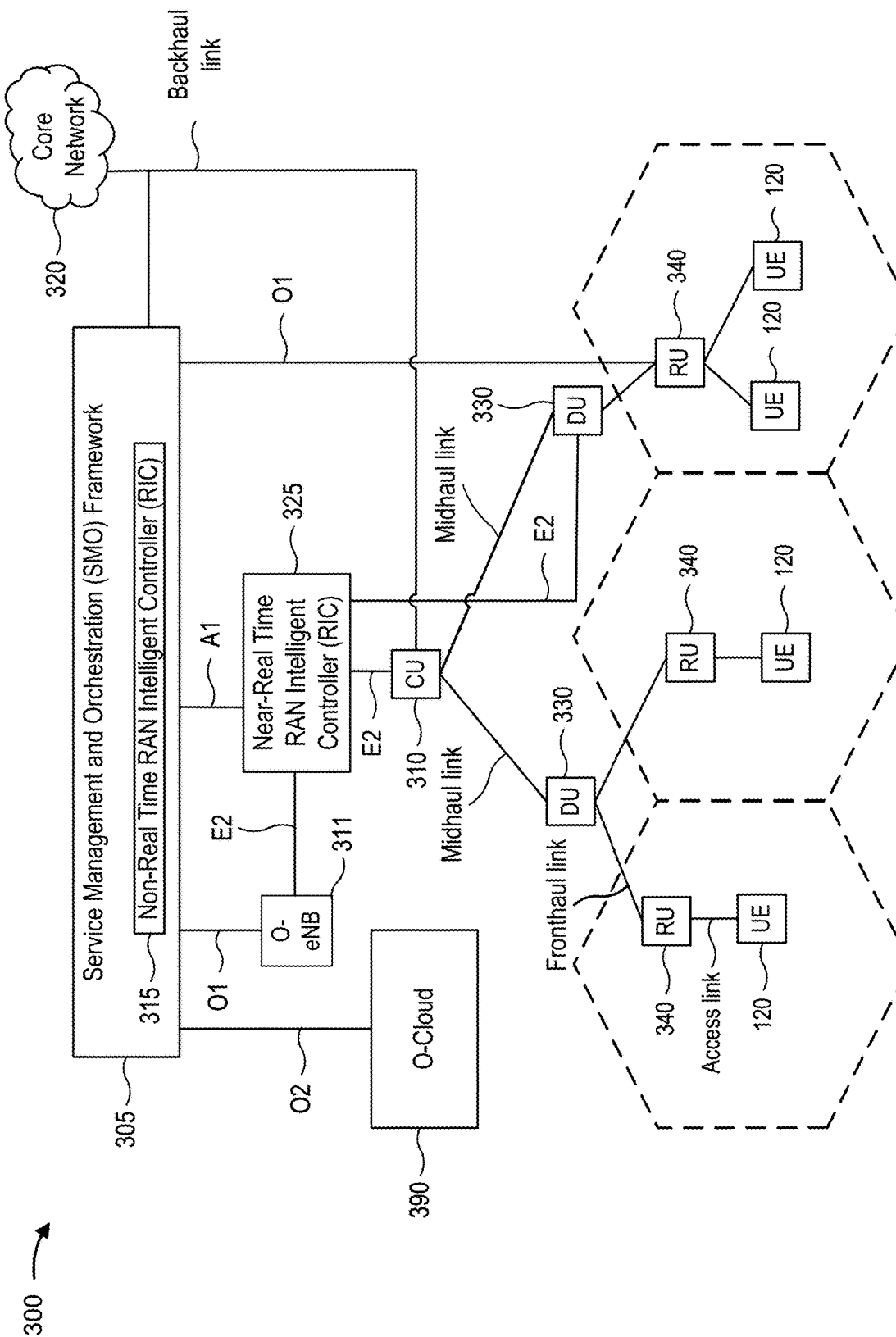
FIG. 3 is a diagram illustrating an example of a disaggregated base station, in accordance with the present disclosure.

FIG. 3 is a diagram illustrating an example of a disaggregated base station 300, in accordance with the present disclosure.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station, or one or more units (or one or more components) performing base station functionality, may be implemented in an aggregated or disaggregated architecture. For example, a BS (such as a Node B, evolved NB (eNB), NR BS, 5G NB, access point (AP), a TRP, or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more CUs, one or more DUs, or one or more RUs). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units (e.g., a virtual central unit (VCU), a virtual distributed unit (VDU), or a virtual radio unit (VRU)).

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

The disaggregated base station 300 architecture may include one or more CUs 310 that can communicate directly with a core network 320 via a backhaul link, or indirectly with the core network 320 through one or more disaggregated base station units (such as a Near-RT RIC 325 via an E2 link, or a Non-Real Time (Non-RT) MC 315 associated with a Service Management and Orchestration (SMO) Framework 305, or both). A CU 310 may communicate with one or more DUs 330 via respective midhaul links, such as an F1 interface. The DUs 330 may communicate with one or more RUs 340 via respective fronthaul links. The fronthaul link, the midhaul link, and the backhaul link may be generally referred to as "communication links." The RUs 340 may communicate with respective UEs 120 via one or more RF access links. In some aspects, the UE 120 may be simultaneously served by multiple RUs 340. The DUs 330 and the RUs 340 may also be referred to as "O-RAN DUs (O-DUs") and "O-RAN RUs (O-RUs)", respectively. A network entity may include a CU, a DU, an RU, or any combination of CUs, DUs, and RUs. A network entity may include a disaggregated base station or one or more components of the disaggregated base station, such as a CU, a DU, an RU, or any combination of CUs, DUs, and RUs. A network entity may also include one or more of a TRP, a relay station, a passive device, an intelligent reflective surface (IRS), or other components that may provide a network interface for or serve a UE, mobile station, sensor/actuator, or other wireless device.

Each of the units, i.e., the CUs 310, the DUs 330, the RUs 340, as well as the Near-RT RICs 325, the Non-RT RICs 315 and the SMO Framework 305, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (i.e., Central Unit-User Plane (CU-UP)), control plane functionality (i.e., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3GPP. In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 120. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340 and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via O1) or via creation of RAN management policies (such as A1 policies).

As indicated above, FIG. 3 is provided as an example. Other examples may differ from what is described with regard to FIG. 3.

FIGS. 4A-4C are diagrams illustrating examples of a satellite deployments in an NTN, in accordance with the present disclosure.

Example 400 in FIG. 4A shows a regenerative satellite deployment. In example 400, a UE 120 is served by a satellite 420 (e.g., satellite 135) via a service link 430. For example, the satellite 420 may include a network entity (e.g., a base station 110, BS 110a, a gNB). In some examples, the satellite 420 may be referred to as a non-terrestrial base station, a regenerative repeater, an on-board processing repeater, and/or an NTN entity. In some examples, the satellite 420 may demodulate an uplink radio frequency signal and may modulate a baseband signal derived from the uplink radio signal to produce a downlink radio frequency transmission. The satellite 420 may transmit the downlink radio frequency signal on the service link 430. The satellite 420 may provide a cell that covers the UE 120. In some examples, the satellite 420 may further communicate with a ground gateway via a feeder link. The satellite 420 may connect to a RAN, a core network, and/or a data network through the gateway.

Example 410 in FIG. 4B shows a transparent satellite deployment, which may also be referred to as a bent-pipe satellite deployment. In example 410, a UE 120 is served by a satellite 440 via the service link 430. The satellite 440 may also be considered to be an NTN entity. The NTN entity may include a CU, one or more DUs, and/or one or more RUs, depending on the deployment with other NTN entities and ground stations. The satellite 440 may be a transparent satellite. The satellite 440 may relay a signal received from the UE 120 via a service link 430 to the gateway 450 via a feeder link 460. In another example, the satellite 440 may receive an uplink radio frequency transmission from the service link 430 and may transmit an uplink radio frequency transmission to the feeder link 460 without demodulating the uplink radio frequency transmission. In some examples, the satellite may frequency convert the uplink radio frequency transmission received on the service link 430 to a frequency of the uplink radio frequency transmission on the feeder link 460 and may amplify and/or filter the uplink radio frequency transmission. In some examples, similar as in the uplink direction, the satellite 440 may relay a downlink signal received from the gateway 450 via the feeder link 460 to the UE 120 via the service link 430. In some examples, the UEs 120 shown in example 400 and example 410 may be associated with a Global Navigation Satellite System (GNSS) capability, a Global Positioning System (GPS) capability, and/or the like, though not all UEs have such capabilities. The satellite 440 may provide a cell that covers the UE 120.

The service link 430 may include a link between the satellite 440 and the UE 120 and may include one or more of an uplink or a downlink. The feeder link 460 may include a link between the satellite 440 and the gateway 450 and may include one or more of an uplink (e.g., from the UE 120 to the gateway 450) or a downlink (e.g., from the gateway 450 to the UE 120).

The feeder link 460 and the service link 430 may each experience Doppler effects due to the movement of the satellites 420 and 440 and, potentially, movement of a UE 120. These Doppler effects may be significantly larger than in a terrestrial network. The Doppler effect on the feeder link 460 may be compensated to some degree but may still be associated with some amount of uncompensated frequency error. Furthermore, the gateway 450 may be associated with a residual frequency error, and/or the satellite 420/440 may be associated with an on-board frequency error. These sources of frequency error may cause a received downlink frequency at the UE 120 to drift from a target downlink frequency.

Satellites 420 and 440 may be a satellite in a GSO or GEO, which may be, for example, 36,000 kilometers (km) above the Earth. The speed of the satellite with respect to Earth may be negligible but have a round-trip propagation delay of more than 500 milliseconds (ms), as compared to 25 ms for an LEO satellite at 600 km above the Earth. In an NTN, where a distance between UE 120 and a satellite can be larger than 600 km, a pathloss change may not be appropriately reflected in a propagation delay change. The UE 120 is expected to be able to autonomously pre-compensate for propagation delay all the way to a reference point, and thus timing advance (TA) validation can be carried out more directly rather than relying on indirect parameters such as RSRP. The UE 120 may use a TA for timing alignment of communications due to a propagation delay. The TA may inform the UE 120 to transmit a communication in uplink earlier than a reference downlink slot timing by the TA amount. The TA may need to be validated if the propagation distance between the UE 120 and the network entity changes. In addition, a satellite may not be always available to the UE 120 if the satellite is in an NGSO.

Some satellite operators may deploy satellite access with intentional coverage gaps, or discontinuous coverage (DC). DC may involve LEO satellites, IoT networks, UAVs, a HAPS, or a satellite constellation that does not cover a particular location on Earth all of the time. Some services may be delay tolerant and may use DC. Such services may include services for IoT devices and networks, services for utility meters, or services that use sensors. DC may be used to address service availability and power consumption. In addition to DC, the feeder link 460 may have intermittent connectivity with a ground station, such as gateway 450. There may be some areas where it is not feasible to deploy a ground station, either due to deployment designs and/or costs (e.g., in remote geographical locations with small populations).

To deal with unavailability of the feeder link 460, a satellite transmitter may include network elements at the satellite 420/440. Both the radio network and the core network aspects may be mounted on the satellite 420/440. In one scenario, the entire control plane and user plane paths may be mounted on the satellite 420/440. For example, the control plane management entity (e.g., mobile management entity (MME) in 4G or an access and mobility management function (AMF) and a session management function (SMF) in NR) as well as the user plane path (e.g., serving gateway (GW) and packet data network GW for 4G or a user plane function in NR) may be mounted on the satellite 420/440. In this scenario, the ground station (e.g., gateway 450) may include the home subscriber services (HSS) including subscription management, user authentication and authorization. Also, in this scenario, some portions of the control plane path can be at the ground station (e.g., coordination between the control plane management entities in different satellites, buffering of user data and control plane data while the feeder link is unavailable). In this scenario, there may also be user data plane and control plane data buffering at the satellite due to DC. Finally, the internet connection for the data plane may be at the ground station. Other functional splits between the satellite transmitter, and the ground station may be employed.

Example 470 in FIG. 4C shows use of an ISL 480 between satellite 440 and satellite 490. The ISL 480 may be used to support coverage extension in the NTN. For example, if gateway 450 is deployed with certain limitations and satellite 440 does not have a direct feeder link connection to gateway 450, satellite 440 may be connected with the ISL 480 to satellite 490, which has the feeder link 460. In this way, satellite 440 has access to the gateway 450 and service availability improves.

In some aspects, network functions of a disaggregated base station may be split between satellites. For example, satellite 440 may perform functions of a DU and satellite 490 may perform functions of a CU.

As indicated above, FIGS. 4A-4C provide some examples. Other examples may differ from what is described with regard to FIGS. 4A-4C.

FIGS. 5A and 5B are diagrams illustrating an example 500 of ISL activation and an example 502 of ISL deactivation, respectively, in accordance with the present disclosure.

Example 500 in FIG. 5A shows that satellite 440 may have a feeder link 510. However, a topology change event may occur, where there is a change in a communication path in the NTN topology. This may include a change in a link that is used or a change in an operation of an NTN entity. In example 500, the topology change event is an ISL activation, where satellite 440 no longer uses feeder link 510 and switches to use of the ISL 480 to peer satellite 490. This may be due to satellite 440 moving to a location where there is no line of sight to the gateway 450. From the viewpoint of the UE, the connection or communication path between satellite 440 and the gateway 450 may be an extended feeder link, even though the communication path proceeds through the ISL 480 and satellite 490.

Example 502 in FIG. 5B shows that a topology change event may be an ISL deactivation, where satellite switches from using the ISL 480 to using the feeder link 510. For example, satellite 440 or the network may determine that satellite 440 has or will have a line of sight with the gateway 450. In other words, satellite 440 may activate use of the ISL 480 when moving further away from the gateway 450 and deactivate use of the ISL 480 when moving closer to the gateway 450.

As indicated above, FIGS. 5A and 5B are provided as examples. Other examples may differ from what is described with regard to FIGS. 5A and 5B.

Figure 6:
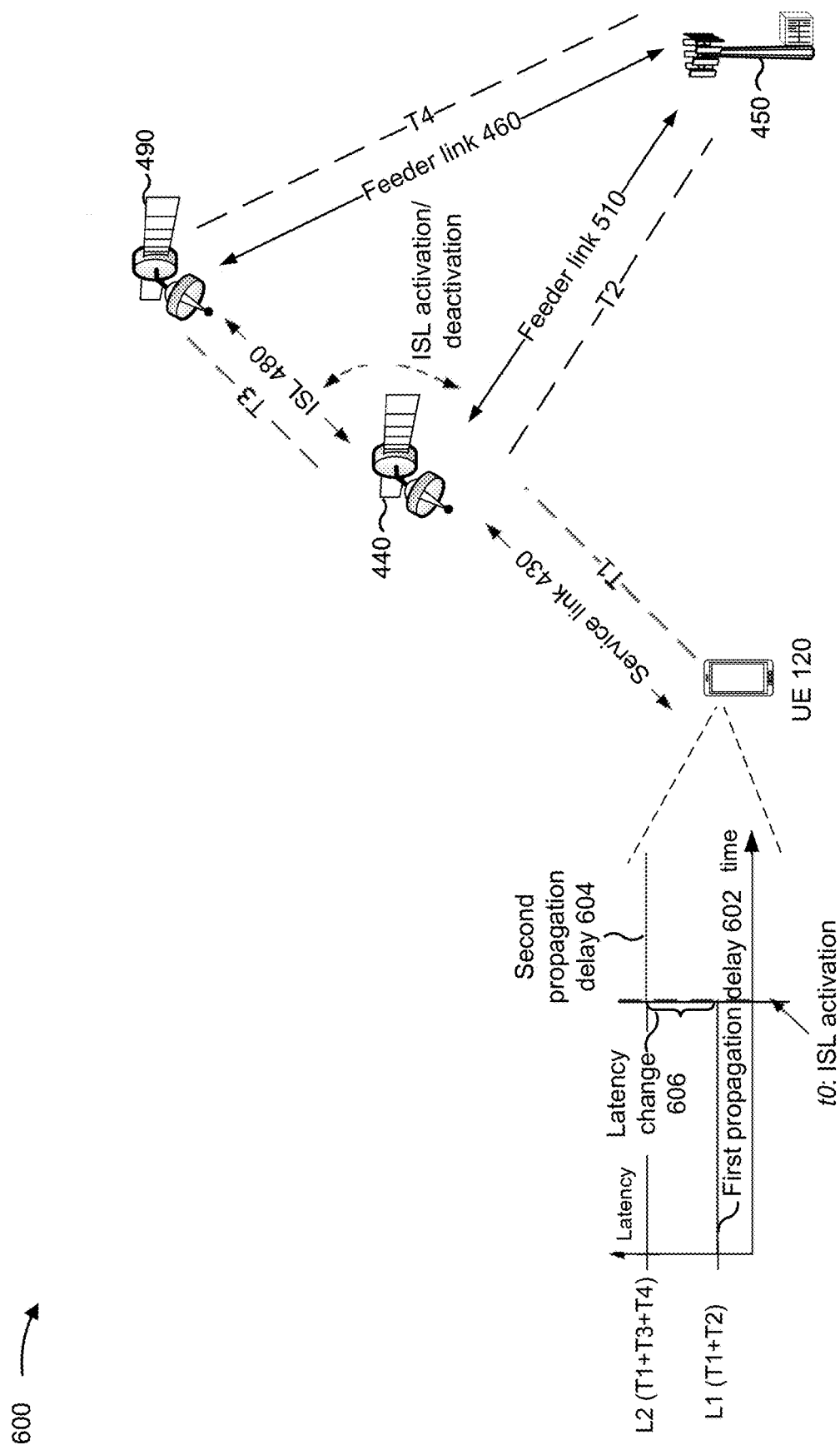
FIG. 6 is a diagram illustrating an example of a change in propagation delays associated with an ISL, in accordance with the present disclosure.

FIG. 6 is a diagram illustrating an example 600 of a change in propagation delays associated with an ISL, in accordance with the present disclosure.

When the ISL 480 is activated or deactivated, the signal propagation delay between the UE 120 and the gateway 450 changes because the first propagation delay 602 (T1+T2) for signal propagation through satellite 440 is less than the second propagation delay 604 (T1+T3+T4) for signal propagation through both satellite 440 and satellite 490 via ISL 480. Accordingly, the communication service will experience a sudden change in latency. The latency change 606 at the ISL activation (time t0) is the difference between the first propagation delay 602 and the second propagation delay 604. According to one or more examples, if satellite 440 is an LEO satellite and satellite 490 is a GEO satellite, the latency change 606 may be over 200 ms. The sudden change in latency can impact the UE's communication service because the UE's communication service is not aware of the reason for such a sudden change. The sudden change in latency may cause unexpected communication service behavior, such as a communication service timeout (e.g., transmission control protocol (TCP) spurious timeout when the round-trip-time (RTT) exceeds the retransmission timer), triggering of a congestion control algorithm (e.g., web real-time communication (WebRTC) algorithm that controls congestion in compliance with the WebRTC framework used for browsers and video calls), or change in the quality of the communication service experience (e.g., quality of experience (QoE) change).

According to one or more aspects described herein, instead of an immediate change in the propagation delay, a UE (e.g., UE 120) may gradually increase or decrease the latency between a first propagation delay before a topology change event (e.g., satellite switch, activation of ISL, deactivation of ISL) and a second propagation delay after the topology change event. This may include buffering communications in a buffer in the memory (e.g., memory 282) and changing a rate of release of communications from the buffer of the UE such that the change in the propagation delay experienced by a service application of the UE transitions gradually from the first propagation delay to the second propagation delay, rather than changing instantly. For the UE receiving communications in association with an ISL activation, the UE may release the communications from the buffer at a rate of release that changes between a transition start time and the ISL activation time. The transition start time may be an estimated time to start changing the rate of release. For the UE transmitting communications in association with an ISL deactivation, the UE may release the communications from the buffer at a rate of release that changes between the ISL deactivation time and a transition end time. The transition end time may be an estimated time to stop changing the rate of release. In this way, the UE may avoid communication timeouts, the triggering of traffic congestion algorithms, unexpected changes in the communication experience, or other results that may drop service or consume additional resources when reconnecting the service. As a result, the UE may reduce latency and conserve processing resources and signaling resources.

As indicated above, FIG. 6 is provided as an example. Other examples may differ from what is described with regard to FIG. 6.

Figure 7:
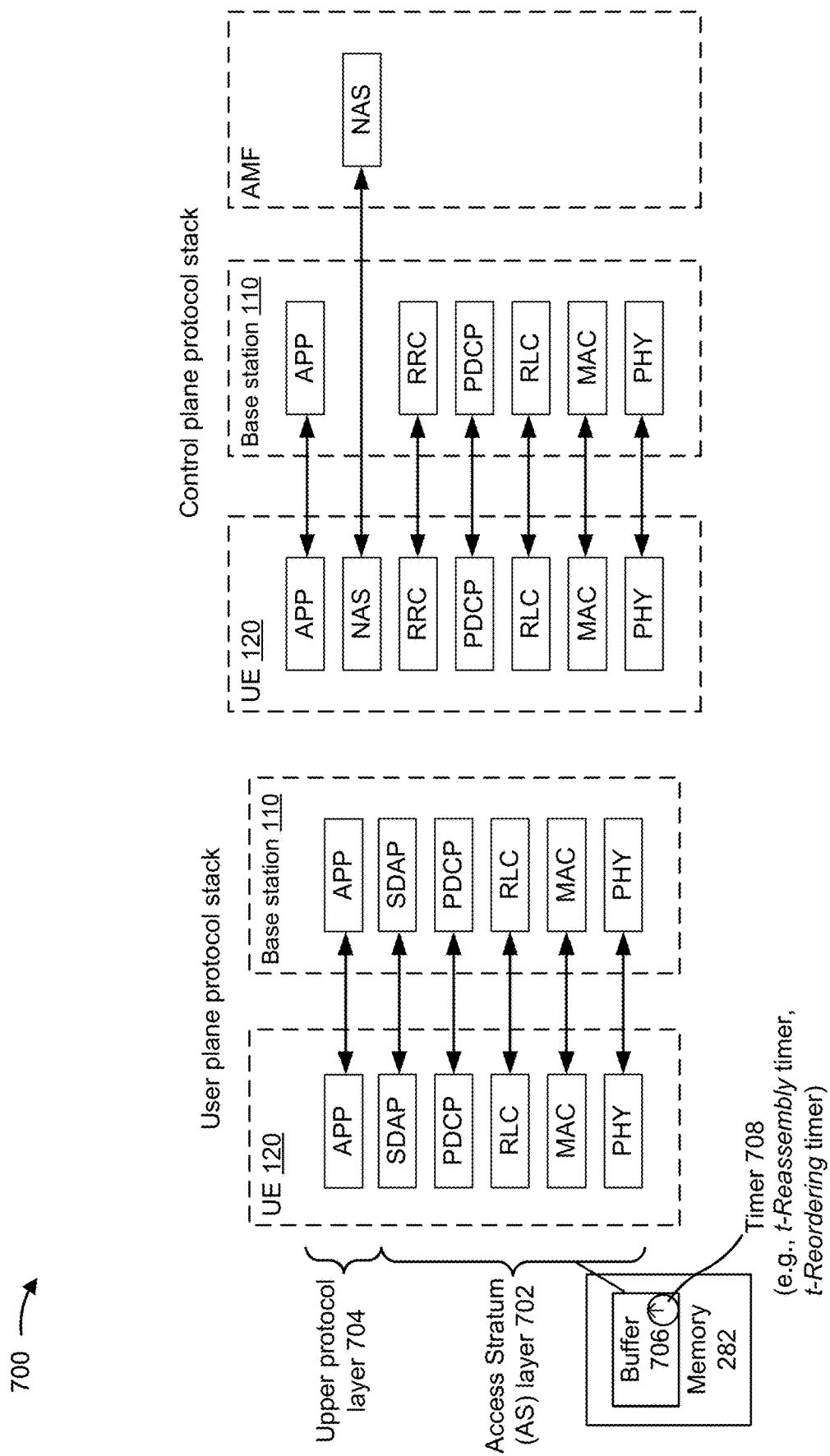
FIG. 7 is a diagram illustrating an example of a user plane protocol stack and a control plane protocol stack for a network entity (e.g., base station) and a core network in communication with a UE, in accordance with the present disclosure.

FIG. 7 is a diagram illustrating an example 700 of a user plane protocol stack and a control plane protocol stack for a network entity (e.g., base station 110) and a core network in communication with a UE 120, in accordance with the present disclosure. In some aspects, the network entity may include a plurality of network nodes. In some aspects, protocol stack functions of the network entity may be distributed across multiple network nodes. For example, a first network entity may implement a first layer of a protocol stack, and a second network entity may implement a second layer of the protocol stack. The distribution of the protocol stack across network nodes (in examples where the protocol stack is distributed across network nodes) may be based at least in part on a functional split, as described elsewhere herein. It should be understood that references to "a network node" or "the network node" can, in some aspects, refer to multiple network nodes.

On the user plane, the UE 120 and the network entity may include respective PHY layers, MAC layers, RLC layers, PDCP layers, and SDAP layers. A user plane function may handle transport of user data between the UE 120 and the network entity. On the control plane, the UE 120 and the network entity may include respective RRC layers. Furthermore, the UE 120 may include a non-access stratum (NAS) layer in communication with an NAS layer of an AMF. The NAS layer may be a functional layer used to manage the establishment of communication sessions and to maintain continuous communications (in contrast to AS layer that is responsible for carrying information over the wireless portions of the network). The NAS uses a set of protocols to convey non-radio signaling between the UE and the 5G core. The AMF may be associated with a core network associated with the network entity, such as a 5G core network (5GC) or a next-generation radio access network (NG-RAN). A control plane function may handle transport of control information between the UE and the core network and/or between the UE and the NG-RAN. Generally, a first layer is referred to as higher than a second layer if the first layer is further from the PHY layer than the second layer. For example, the PHY layer may be referred to as a lowest layer, and the SDAP/PDCP/RLC/MAC layer may be referred to as higher than the PHY layer and lower than the RRC layer. An AS layer 702 may be any of the SDAP/PDCP/RLC/MAC layers. The AS layer 702 may be a layer that is involved with radio operations. An application (APP) layer may be an upper protocol layer 704 that is higher than the SDAP/PDCP/RLC/MAC layer. The upper protocol layer 704 may be a layer that manages applications or services. In some examples, the APP layer may reside in an entity belonging to the data network, instead of residing in the network entity (e.g., base station 110). In some examples, an entity may handle the services and functions of a given layer (e.g., a PDCP entity may handle the services and functions of the PDCP layer), though the description herein refers to the layers themselves as handling the services and functions.

The RRC layer may handle communications related to configuring and operating the UE 120, such as: broadcast of system information related to the AS and the NAS; paging initiated by the 5GC or the NG-RAN; establishment, maintenance, and release of an RRC connection between the UE and the NG-RAN, including addition, modification, and release of carrier aggregation, as well as addition, modification, and release of dual connectivity; security functions including key management; establishment, configuration, maintenance, and release of signaling radio bearers (SRBs) and data radio bearers (DRBs); mobility functions (e.g., handover and context transfer, UE cell selection and reselection and control of cell selection and reselection, inter-RAT mobility); quality of service (QoS) management functions; UE measurement reporting and control of the reporting; detection of and recovery from radio link failure; and NAS message transfer between the NAS layer and the lower layers of the UE 120. The RRC layer is frequently referred to as Layer 3 (L3).

The SDAP layer, PDCP layer, RLC layer, and MAC layer may be collectively referred to as Layer 2 (L2). Thus, in some cases, the SDAP, PDCP, RLC, and MAC layers are referred to as sublayers of Layer 2. On the transmitting side (e.g., if the UE 120 is transmitting an uplink communication or the network node 110 is transmitting a downlink communication), the SDAP layer may receive a data flow in the form of a QoS flow. A QoS flow is associated with a QoS identifier, which identifies a QoS parameter associated with the QoS flow, and a QoS flow identifier (QFI), which identifies the QoS flow. Policy and charging parameters are enforced at the QoS flow granularity. A QoS flow can include one or more service data flows (SDFs), so long as each SDF of a QoS flow is associated with the same policy and charging parameters. In some aspects, the RRC/NAS layer may generate control information to be transmitted and may map the control information to one or more radio bearers for provision to the PDCP layer.

The SDAP layer, or the RRC/NAS layer, may map QoS flows or control information to radio bearers. Thus, the SDAP layer may be said to handle QoS flows on the transmitting side. The SDAP layer may provide the QoS flows to the PDCP layer via the corresponding radio bearers. The PDCP layer may map radio bearers to RLC channels. The PDCP layer may handle various services and functions on the user plane, including sequence numbering, header compression and decompression (if robust header compression is enabled), transfer of user data, reordering and duplicate detection (if in-order delivery to layers above the PDCP layer is required), PDCP protocol data unit (PDU) routing (in case of split bearers), retransmission of PDCP service data units (SDUs), ciphering and deciphering, PDCP SDU discard (e.g., in accordance with a timer, as described elsewhere herein), PDCP re-establishment and data recovery for RLC acknowledged mode (AM), and duplication of PDCP PDUs. The PDCP layer may handle similar services and functions on the control plane, including sequence numbering, ciphering, deciphering, integrity protection, transfer of control plane data, duplicate detection, and duplication of PDCP PDUs.

The PDCP layer may provide data, in the form of PDCP PDUs, to the RLC layer via RLC channels. The RLC layer may handle transfer of upper layer PDUs to the MAC and/or PHY layers, sequence numbering independent of PDCP sequence numbering, error correction via automatic repeat requests (ARQ), segmentation and re-segmentation, reassembly of an SDU, RLC SDU discard, and RLC re-establishment.

The RLC layer may provide data, mapped to logical channels, to the MAC layer. The services and functions of the MAC layer include mapping between logical channels and transport channels (used by the PHY layer as described below), multiplexing/demultiplexing of MAC SDUs belonging to one or different logical channels into/from transport blocks (TBs) delivered to/from the physical layer on transport channels, scheduling information reporting, error correction through hybrid ARQ (HARD), priority handling between UEs by means of dynamic scheduling, priority handling between logical channels of one UE by means of logical channel prioritization, and padding.

The MAC layer may package data from logical channels into TBs, and may provide the TBs on one or more transport channels to the PHY layer. The PHY layer may handle various operations relating to transmission of a data signal, as described in more detail in connection with FIG. 2. The PHY layer is frequently referred to as Layer 1 (L1).

On the receiving side (e.g., if the UE 120 is receiving a downlink communication or the network entity is receiving an uplink communication), the operations may be similar to those described for the transmitting side, but reversed. For example, the PHY layer may receive TBs and may provide the TBs on one or more transport channels to the MAC layer. The MAC layer may map the transport channels to logical channels and may provide data to the RLC layer via the logical channels. The RLC layer may map the logical channels to RLC channels and may provide data to the PDCP layer via the RLC channels. The PDCP layer may map the RLC channels to radio bearers and may provide data to the SDAP layer or the RRC/NAS layer via the radio bearers.

Data may be passed between the layers in the form of PDUs and SDUs. An SDU is a unit of data that has been passed from a layer or sublayer to a lower layer. For example, the PDCP layer may receive a PDCP SDU. A given layer may then encapsulate the unit of data into a PDU and may pass the PDU to a lower layer. For example, the PDCP layer may encapsulate the PDCP SDU into a PDCP PDU and may pass the PDCP PDU to the RLC layer. The RLC layer may receive the PDCP PDU as an RLC SDU, may encapsulate the RLC SDU into an RLC PDU, and so on. In effect, the PDU carries the SDU as a payload.

In some aspects, a UE may operate one or more buffers at the AS layer 702. The one or more buffers may be included in the memory 282. For example, a buffer 706 in the memory 282 of a UE (e.g., UE 120) may buffer (e.g., store in memory for later release from the buffer) received communications and later release the communications. The buffer 706 may exist or operate at the AS layer 702 (e.g., at an RLC layer) and the buffer 706 may release communications to the upper protocol layer 704. An application that provides a communication service may exit or operate at the upper protocol layer 704 (e.g., application layer, a service layer, transport layer). The application may determine if there is a problem (e.g., loss of signal, too much delay, congestion) with a feeder link or a service link and take action to remedy the problem (e.g., reestablish a link). The buffer 706 may release communication to the upper protocol layer 704 to be used by the application.

In some aspects, the buffer 706 may store communications to be transmitted. The buffer may exist or operate at the AS layer 702. The buffer 706 may release the communications to a lower protocol layer, such as the MAC layer or the PHY layer for transmission.

In some aspects, the buffer 706 may store communications at a rate (rate of buffering) that is used to assist with the gradual increase or decrease in latency. The rate of buffering may be based at least in part on a difference in propagation delays, a configured function, and/or a latency sensitivity of a service or quality of service flow.

As indicated above, FIG. 7 is provided as an example. Other examples may differ from what is described with regard to FIG. 7.

Figure 8:
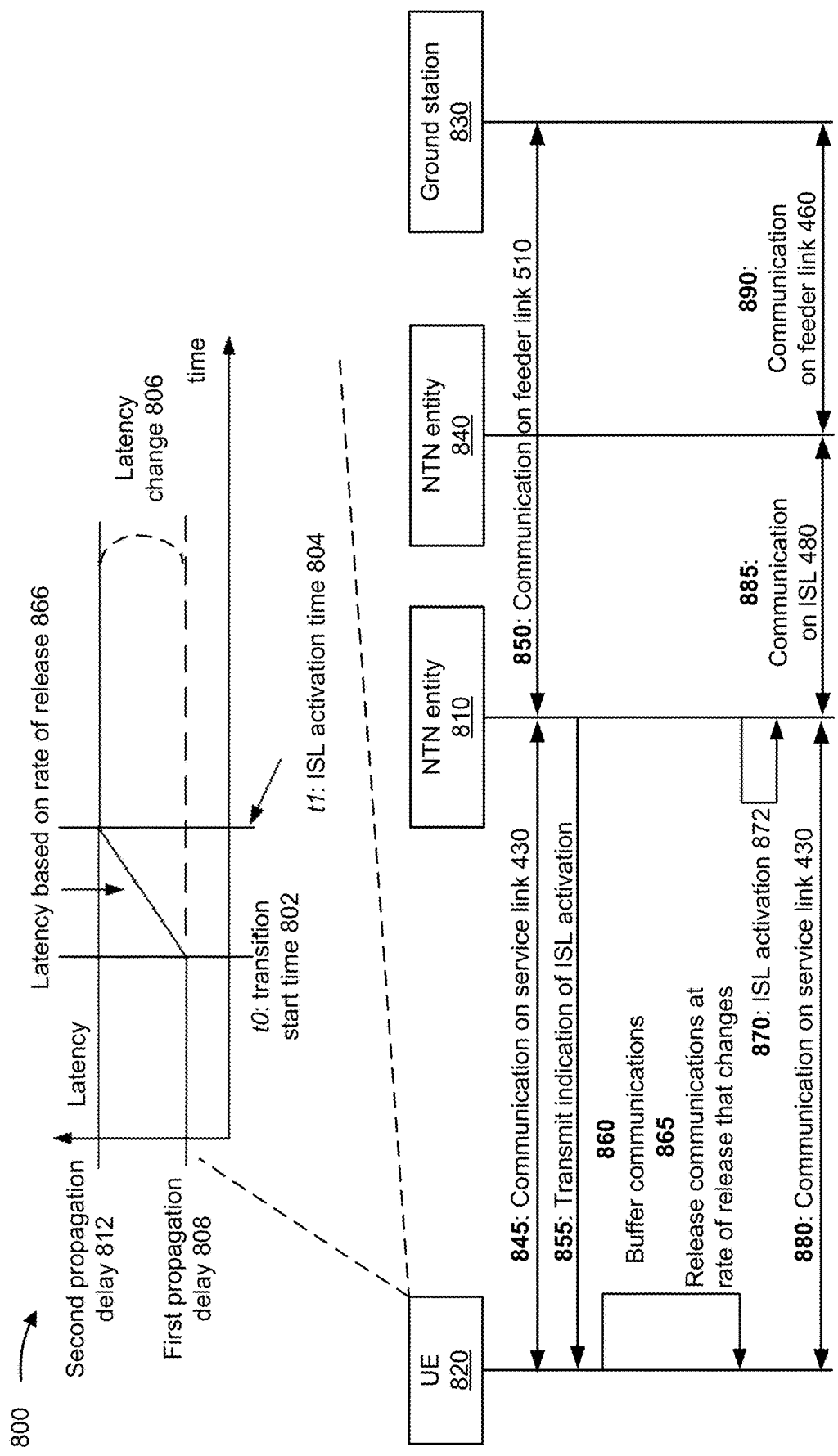
FIG. 8 is a diagram illustrating an example of a gradual increase in latency for received communications, in accordance with the present disclosure.

FIG. 8 is a diagram illustrating an example 800 of a gradual increase in latency for received communications, in accordance with the present disclosure.

Example 800 shows a gradual transition of the UE 820 from a transition start time 802 (t0) to an ISL activation time 804 (t1). The gradual transition may be part of a transition phase that occurs before ISL activation. The gradual transition involves a latency change 806 from a first propagation delay 808 (communication via NTN entity 810) before ISL activation to a second propagation delay 812 (communication via NTN entity 810 and NTN entity 840) after ISL activation.

Example 800 also shows an NTN entity 810 (e.g., base station 110, network entity, satellite 420, satellite 440) and a UE 820 (e.g., UE 120) may communicate with one another. The UE 820 and a terrestrial network entity (e.g., ground station 830) may communicate via the NTN entity 810. The ground station 830 may be a base station (e.g., base station 110) or a gateway (e.g., gateway 450). There may be another NTN entity 840 (e.g., base station 110, network entity, satellite 420, satellite 490) that has a feeder link (e.g., feeder link 460) to the terrestrial network entity, and there may be an ISL (e.g., ISL 480) that is activated or deactivated between NTN entity 810 and NTN entity 840.

As shown by reference number 845, the UE 820 and the NTN entity 810 may communicate via the service link 430. As shown by reference number 850, the NTN entity 810 and the ground station 830 may communicate via feeder link 510. This is before a topology change event such as the ISL activation.

As shown by reference number 855, the NTN entity 810 may transmit an indication of an ISL activation. The indication may be received in an SIB, which may be NTN-specific or dedicated for NTN. The indication may be received in downlink control information (DCI), a MAC CE, or an RRC message. The indication may be received via a short message over a physical downlink control channel (PDCCH) in a paging occasion (e.g., for RRC inactive or RRC idle UE). The indication may be received in a dedicated RRC message for RRC connected UE. For example, the indication may be a handover command, where the target cell identifier (ID) contained in the handover command indicates the same cell ID as the UE 820's current serving cell over the service link 430 before the topology change event. Thus, if the UE 820 receives a handover command that requests the UE 820 to hand over to the current serving cell, the UE 820 may detect the indication. The indication may be broadcast in a system information block (SIB). The indication may activate the buffer used for gradually increasing or decreasing latency.

In some aspects, the UE 820 may obtain the indication through a schedule, a calculation, or another communication. The indication may include the ISL activation time 804. The UE 820 may also receive an indication of the transition start time 802. Alternatively, the UE 820 may calculate the transition start time 802 based at least in part on an indication or a calculated estimate of the latency change 806. The UE 820 may calculate the transition start time 802 based at least in part on an indication of changes to a service link or a feeder link.

As shown by reference number 860, the UE 820 may buffer or may have buffered communications received from the NTN entity 810. The UE 820 may buffer the communications in a buffer (e.g., buffer 706) at the AS layer 702. The buffer may be an additional buffer between the AS layer 702 and the upper protocol layer 704. The additional buffer may be a dedicated buffer that is activated only for the gradual increase or decrease of latency.

As shown by reference number 865, the UE 820 may release the communications at a rate of release 866 that changes between the transition start time 802 and the ISL activation time 804. For example, the rate of release may be decreasing and thus the latency may be increasing. The buffer may release the communications to an upper protocol layer (e.g., upper protocol layer 704, an application layer, a service layer, a transport layer). In some aspects, the rate of release 866 of the communications from the buffer may be based on a function of time, where a time instance or other time information (e.g., ISL activation time 804, transition start time 802, first propagation delay 808, second propagation delay 812, latency change 806) are inputs, and an amount of latency and/or the rate of release 866 is the output. The function may be linear function that gradually increases at a steady rate. The function may be a stepped function where the latency increases a specified amount at instances of time. The function may be a non-linear function or any other function for changing the rate of release 866 between the transition start time 802 and the ISL activation time 804. The UE 820 may change the rate of release by changing a timer 708 of the buffer or otherwise adjusting a buffering time. The UE 820 may change the rate of release or rate of buffering by adjusting the timer 708 for the buffer at a specific layer, such as at the RLC layer or the PDCP layer (e.g., t-Reassembly timer, t-Reordering timer).

As shown by reference number 870, NTN entity 810 may perform the ISL activation (shown by ISL activation 872) at the ISL activation time 804. By this time, the gradual increase in latency may have been completed. As a result, there is no sudden change in latency and communications are not disrupted. This reduces latency and conserves processing resources and signaling resources.

While example 800 shows the latency increasing based on the rate of release 866 because the first propagation delay 808 before ISL activation is less than the second propagation delay 812 after ISL activation, in some aspects, the latency may be decreasing if the first propagation delay 808 before ISL activation is greater than the second propagation delay 812 after ISL activation.

As shown by reference number 880, the UE 820 and NTN entity 810 may communicate using the service link 430 shown in FIG. 5. As shown by reference number 885, NTN entity 810 may communicate with NTN entity 840 via the ISL 480. As shown by reference number 890, NTN entity 840 may communicate with the ground station 830 using the feeder link 510 shown in FIG. 5.

As indicated above, FIG. 8 is provided as an example. Other examples may differ from what is described with regard to FIG. 8.

Figure 9:
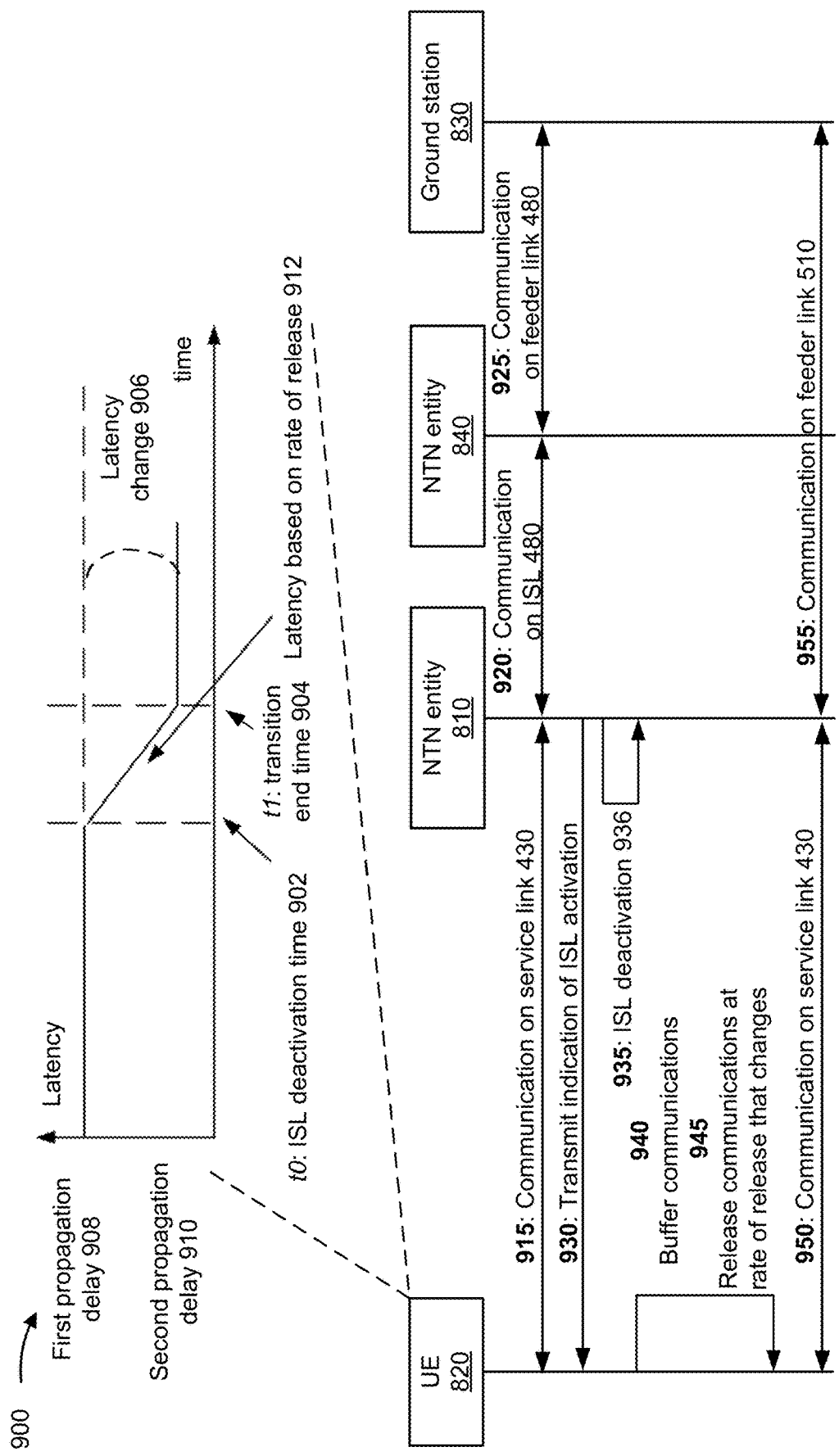
FIG. 9 is a diagram illustrating an example of a gradual increase in latency for received communications, in accordance with the present disclosure.

FIG. 9 is a diagram illustrating an example 900 of a gradual increase in latency for received communications, in accordance with the present disclosure.

Example 900 shows a gradual transition of the UE 820 from an ISL deactivation time 902 (t0) to a transition end time 904 (t1). The gradual transition may be part of a transition phase that occurs after ISL deactivation. The gradual transition involves a latency change 906 from a first propagation delay 908 (communication via NTN entity 810 and NTN entity 840) before ISL deactivation to a second propagation delay 910 (communication via NTN entity 810) after ISL deactivation. The latency may be decreasing at a rate of release 912 that is increasing.

As shown by reference number 915, the UE 820 and NTN entity 810 may communicate using the service link 430 shown in FIG. 5. As shown by reference number 920, NTN entity 810 may communicate with NTN entity 840 via the ISL 480. As shown by reference number 925, NTN entity 840 may communicate with the ground station 830 using the feeder link 510 shown in FIG. 5. This is before a topology change event such as the ISL deactivation.

As shown by reference number 930, the NTN entity 810 may transmit an indication of an ISL deactivation. In some aspects, the UE 820 may obtain the indication through a schedule, a calculation, or another communication. The indication may include the ISL deactivation time 902. The indication may include the transition end time 904. Alternatively, the UE 820 may calculate the transition end time based at least in part on an indication or a calculated estimate of the latency change 906.

As shown by reference number 935, NTN entity 810 may perform the ISL deactivation (shown by ISL deactivation 936) at the ISL deactivation time 902. As shown by reference number 940, the UE 820 may buffer or may have buffered communications for transmission. The communications may be received from the upper protocol layer 704. The UE 820 may buffer the communications in a buffer (e.g., buffer 706) at the upper protocol layer 704 or at the AS layer 702. As shown by reference number 945, the UE 820 may release the communications at a rate of release 912 that changes between the ISL deactivation time 902 to the transition end time 904. The rate of release 912 may be increasing and thus the latency is decreasing. The buffer may release the communications to a lower protocol layer (e.g., MAC layer and/or PHY layer) for transmission. The UE 820 may transmit the communications as they are released from the buffer. In some aspects, the rate of release 912 of the communications from the buffer may be based on a function of time, where a time instance is an input, and a latency and/or the rate of release 912 is the output. The function may be linear function that gradually decreases at a steady rate. The function may be a stepped function where the latency increases a specified amount at instances of time. The function may be a non-linear function or any other function for changing the rate of release 912 between the ISL deactivation time 902 and the transition end time 904. The UE 820 may change the rate of release by changing a timer of the buffer. By the transition end time 904, the gradual decrease in latency may have been completed. As a result, there is no sudden change in latency and communications are not disrupted. This reduces latency and conserves processing resources and signaling resources.

As shown by reference number 950, the UE 820 and the NTN entity 810 may communicate via the service link 430. As shown by reference number 955, the NTN entity 810 and the ground station 830 may communicate via feeder link 510.

While example 800 shows the latency decreasing based on the rate of release 912 because the first propagation delay 908 before ISL activation is greater than the second propagation delay 910 after ISL deactivation, in some aspects, the latency may be increasing if the first propagation delay 908 before ISL deactivation is less than the second propagation delay 910 after ISL deactivation.

In some aspects, the UE 820 may determine to perform a gradual increase or decrease in latency based at least in part on a change in the propagation delay, the type of service, characteristics of the service, a QoS flow, or any combination thereof. For example, if the latency change 806 or 906 satisfies a threshold (e.g., minimum latency change, amount of time), the UE 820 may use the gradual increase or decrease in latency. If the latency change 806 or 906 does not satisfy the threshold, the UE 820 may not use the gradual increase or decrease in latency. The determination may be based on a relative change in the propagation delay, such as the latency change 806 or 906 in proportion to (e.g., divided by) the first propagation delay 808 or 908. In some aspects, the UE 820 may trigger the gradual increase or decrease in latency based at least in part on a service or QoS being sensitive to a sudden latency change.

In some aspects, the indication of the ISL activation or ISL deactivation may include other information about the transition, such as a duration of a transition phase. The duration may be larger or smaller based at least in part on the size of the latency change 806 or 906. The indication may include parameters to be used during the transition phase. For example, the parameters may include a function to be used by the UE 820 to gradually adjust the latency during the transition phase. The parameters may include how the UE 820 should use a current buffer at a specific layers, such as at an RLC or a PDCP layer. The parameters may identify the impacted QoS flow(s) or service(s) such that only the UE(s) with an impacted QoS flow or service applies the gradual increase or decrease in latency.

In some aspects, the gradual latency operations described for the UE 820 may be performed by a network entity, such as a network entity that neighbors or is nearby the UE 820. In some aspects, the network entity may be one or more of NTN entity 810, NTN entity 840, and ground station 830. In some aspects, the gradual latency operations performed by UE 820 and the gradual latency operations performed by the network entity may be applied for the transmission in different directions. For example, when an ISL is to be activated, the UE 820 may release the received downlink data with an increased latency, while the network entity may release the received uplink data with an increased latency.

As indicated above, FIG. 9 is provided as an example. Other examples may differ from what is described with regard to FIG. 9.

Figure 10:
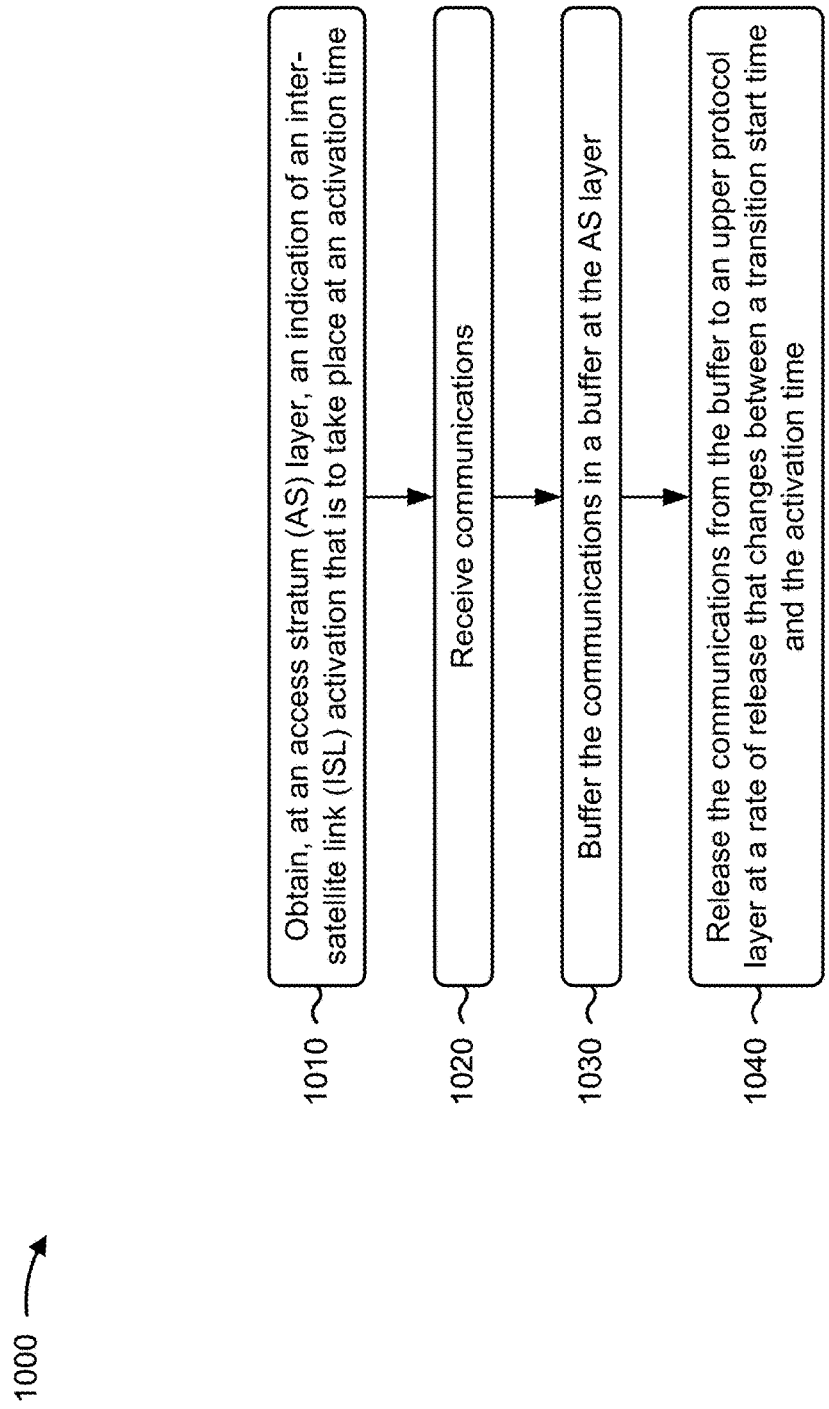
FIG. 10 is a diagram illustrating an example process performed, for example, by a wireless communication device, in accordance with the present disclosure.

FIG. 10 is a diagram illustrating an example process 1000 performed, for example, by a wireless communication device, in accordance with the present disclosure. Example process 1000 is an example where the wireless communication device (e.g., UE 820, a network entity) performs operations associated with buffer release of received communications in association with an ISL transition.

As shown in FIG. 10, in some aspects, process 1000 may include obtaining, at an AS layer, an indication of an ISL activation that is to take place at an activation time (block 1010). For example, the wireless communication device (e.g., using communication manager 1208 or 1508 and/or transition component 1210 or 1510 depicted in FIG. 12 or 15) may obtain, at an AS layer, an indication of an ISL activation that is to take place at an activation time, as described above.

As further shown in FIG. 10, in some aspects, process 1000 may include receiving communications (block 1020). For example, the wireless communication device (e.g., using communication manager 1208 or 1508 and/or reception component 1202 or 1502 depicted in FIG. 12 or 15) may receive communications, as described above.

As further shown in FIG. 10, in some aspects, process 1000 may include buffering the communications in a buffer at the AS layer (block 1030). For example, the wireless communication device (e.g., using communication manager 1208 or 1508 and/or buffer component 1212 or 1512 depicted in FIG. 12 or 15) may buffer the communications in a buffer at the AS layer, as described above.

As further shown in FIG. 10, in some aspects, process 1000 may include releasing the communications from the buffer to an upper protocol layer at a rate of release that changes between a transition start time and the activation time (block 1040). For example, the wireless communication device (e.g., using communication manager 1208 or 1508 and/or buffer component 1212 or 1512 depicted in FIG. 12 or 15) may release the communications from the buffer to an upper protocol layer at a rate of release that changes between a transition start time and the activation time, as described above.

Process 1000 may include additional aspects, such as any single aspect or any combination of aspects described below and/or in connection with one or more other processes described elsewhere herein.

In a first aspect, obtaining the indication includes receiving the indication.

In a second aspect, alone or in combination with the first aspect, process 1000 includes determining the transition start time based at least in part on the indication.

In a third aspect, alone or in combination with one or more of the first and second aspects, process 1000 includes determining, based at least in part on the indication, a difference between a first propagation latency before the ISL activation and a second propagation latency after the ISL activation.

In a fourth aspect, alone or in combination with one or more of the first through third aspects, process 1000 includes determining the transition start time based at least in part on the difference.

In a fifth aspect, alone or in combination with one or more of the first through fourth aspects, a rate of buffering or the rate of release changes based at least in part on the difference satisfying a threshold.

In a sixth aspect, alone or in combination with one or more of the first through fifth aspects, the rate of release increases in response to the second propagation latency being greater than the first propagation latency.

In a seventh aspect, alone or in combination with one or more of the first through sixth aspects, the rate of release decreases in response to the second propagation latency being less than the first propagation latency.

In an eighth aspect, alone or in combination with one or more of the first through seventh aspects, a rate of buffering or the rate of release changes based at least in part on a configured function.

In a ninth aspect, alone or in combination with one or more of the first through eighth aspects, the configured function is a linear function.

In a tenth aspect, alone or in combination with one or more of the first through ninth aspects, the configured function is a non-linear function.

In an eleventh aspect, alone or in combination with one or more of the first through tenth aspects, the configured function is a stepped function.

In a twelfth aspect, alone or in combination with one or more of the first through eleventh aspects, process 1000 includes changing the rate of release by changing a timer associated with the buffer.

In a thirteenth aspect, alone or in combination with one or more of the first through twelfth aspects, a rate of buffering or the rate of release changes based at least in part on a latency sensitivity of a service or quality of service flow.

In a fourteenth aspect, alone or in combination with one or more of the first through thirteenth aspects, buffering the communications includes buffering the communications using a buffer that is activated based at least in part on receiving the indication of the ISL activation.

In a fifteenth aspect, alone or in combination with one or more of the first through fourteenth aspects, the wireless communication device is a UE.

In a sixteenth aspect, alone or in combination with one or more of the first through fifteenth aspects, the wireless communication device is a network entity, such as a network entity that neighbors a UE.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
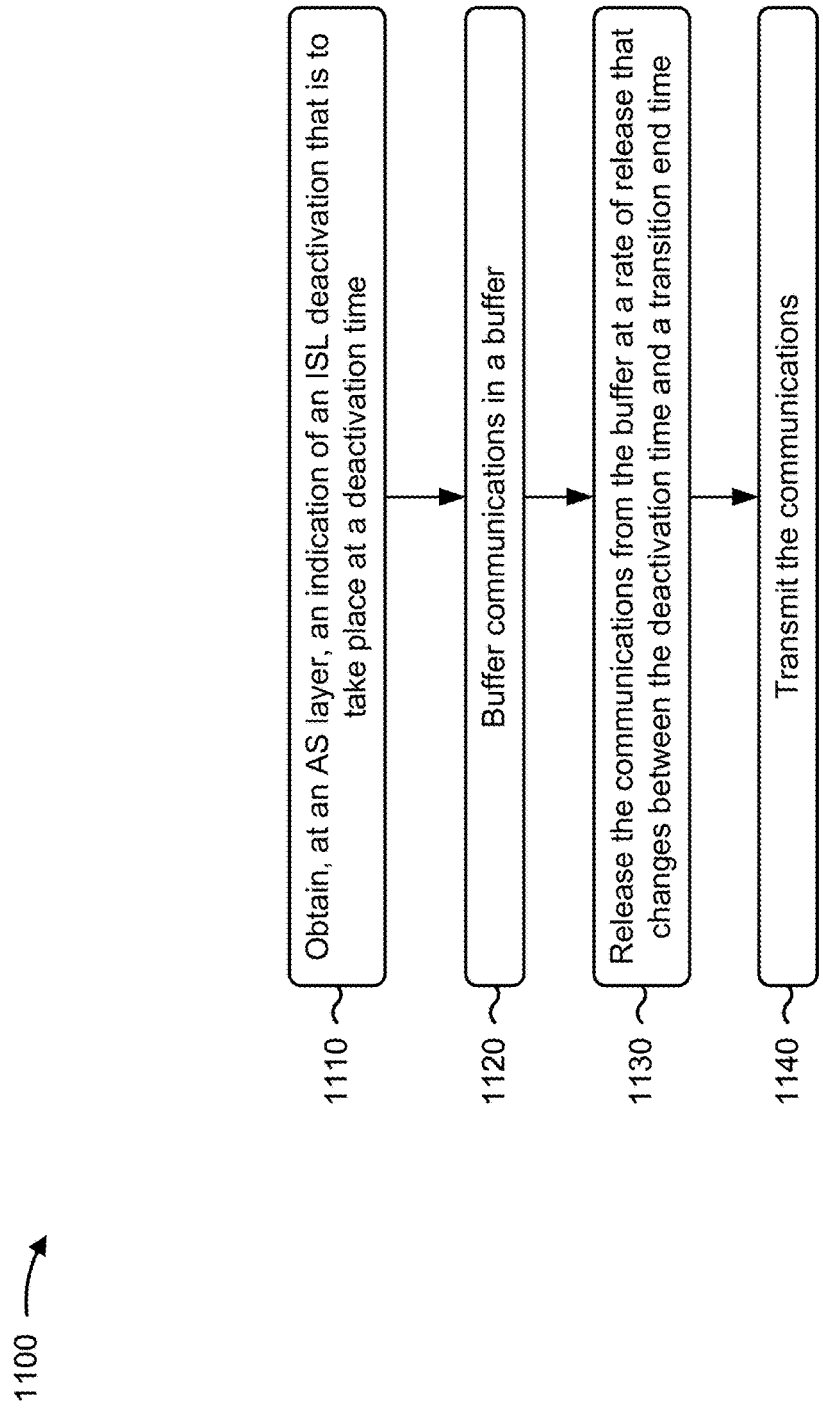
FIG. 11 is a diagram illustrating an example process performed, for example, by a UE, in accordance with the present disclosure.

FIG. 11 is a diagram illustrating an example process 1100 performed, for example, by a UE, in accordance with the present disclosure. Example process 1100 is an example where the UE (e.g., UE 120, UE 820) performs operations associated with buffer release of communications for transmission in association with an ISL transition.

As shown in FIG. 11, in some aspects, process 1100 may include obtaining, at an AS layer, an indication of an ISL deactivation that is to take place at a deactivation time (block 1110). For example, the UE (e.g., using communication manager 1208 and/or transition component 1210 depicted in FIG. 12) may obtain, at an AS layer, an indication of an ISL deactivation that is to take place at a deactivation time, as described above.

As further shown in FIG. 11, in some aspects, process 1100 may include buffering communications in a buffer (block 1120). For example, the UE (e.g., using communication manager 1208 and/or buffer component 1212 depicted in FIG. 12) may buffer communications in a buffer, as described above.

As further shown in FIG. 11, in some aspects, process 1100 may include releasing the communications from the buffer at a rate of release that changes between the deactivation time and a transition end time (block 1130). For example, the UE (e.g., using communication manager 1208 and/or buffer component 1212 depicted in FIG. 12) may release the communications from the buffer at a rate of release that changes between the deactivation time and a transition end time, as described above.

As further shown in FIG. 11, in some aspects, process 1100 may include transmitting the communications (block 1140). For example, the UE (e.g., using communication manager 1208 and/or transmission component 1204 depicted in FIG. 12) may transmit the communications, as described above.

Process 1100 may include additional aspects, such as any single aspect or any combination of aspects described below and/or in connection with one or more other processes described elsewhere herein.

In a first aspect, process 1100 includes determining the transition end time based at least in part on the indication.

In a second aspect, alone or in combination with the first aspect, process 1100 includes determining, based at least in part on the indication, a difference between a first propagation latency before the ISL deactivation and a second propagation latency after the ISL deactivation.

In a third aspect, alone or in combination with one or more of the first and second aspects, process 1100 includes determining the transition end time based at least in part on the difference.

In a fourth aspect, alone or in combination with one or more of the first through third aspects, a rate of buffering or the rate of release changes based at least in part on the difference satisfying a threshold.

In a fifth aspect, alone or in combination with one or more of the first through fourth aspects, a rate of buffering or the rate of release changes based at least in part on a configured function.

In a sixth aspect, alone or in combination with one or more of the first through fifth aspects, process 1100 includes changing the rate of release by changing a timer associated with the buffer.

In a seventh aspect, alone or in combination with one or more of the first through sixth aspects, a rate of buffering or the rate of release changes based at least in part on a latency sensitivity of a service or quality of service flow.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
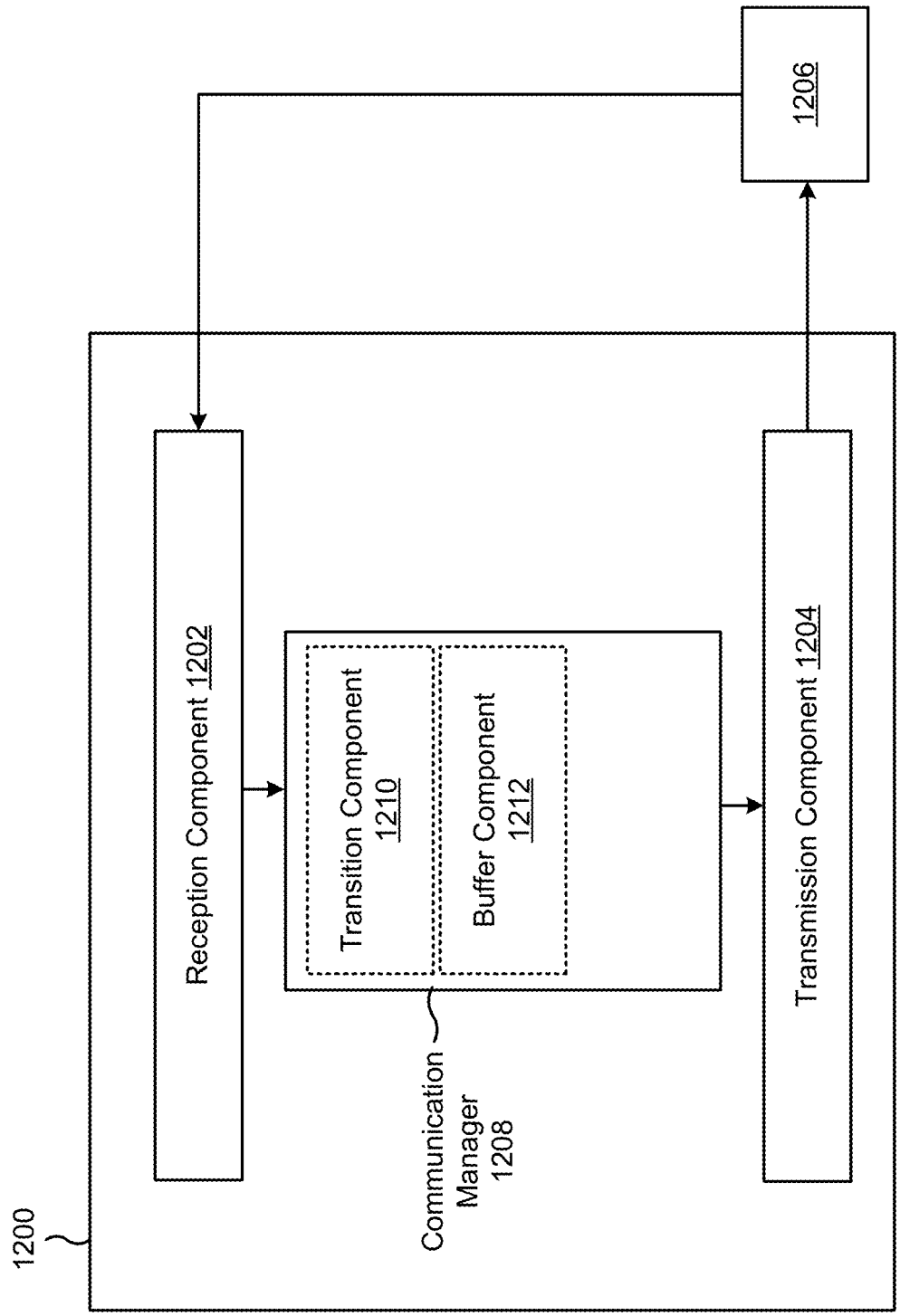
FIG. 12 is a diagram of an example apparatus for wireless communication, in accordance with the present disclosure.

FIG. 12 is a diagram of an example apparatus 1200 for wireless communication, in accordance with the present disclosure. The apparatus 1200 may be a UE (e.g., UE 120, UE 820), or a UE may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include the communication manager 1208. The communication manager 1208 may control and/or otherwise manage one or more operations of the reception component 1202 and/or the transmission component 1204. In some aspects, the communication manager 1208 may include one or more antennas, a modem, a controller/processor, a memory, or a combination thereof, of the UE described in connection with FIG. 2. The communication manager 1208 may be, or be similar to, the communication manager 140 depicted in FIGS. 1 and 2. For example, in some aspects, the communication manager 1208 may be configured to perform one or more of the functions described as being performed by the communication manager 140. In some aspects, the communication manager 1208 may include the reception component 1202 and/or the transmission component 1204. The communication manager 1208 may include a transition component 1210 and/or a buffer component 1212, among other examples.

In some aspects, the apparatus 1200 may be configured to perform one or more operations described herein in connection with FIGS. 1-9. Additionally, or alternatively, the apparatus 1200 may be configured to perform one or more processes described herein, such as process 1000 of FIG. 10, process 1100 of FIG. 11, or a combination thereof. In some aspects, the apparatus 1200 and/or one or more components shown in FIG. 12 may include one or more components of the UE described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the UE described in connection with FIG. 2.

The transmission component 1204 may transmit communications, such as reference signals, control information, data communications, or a combination thereof, to the apparatus 1206. In some aspects, one or more other components of the apparatus 1200 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modem, a modulator, a transmit MIMO processor, a transmit processor, a controller/processor, a memory, or a combination thereof, of the UE described in connection with FIG. 2. In some aspects, the transmission component 1204 may be co-located with the reception component 1202 in a transceiver.

In some aspects, the transition component 1210 may obtain, at an AS layer, an indication of an ISL activation that is to take place at an activation time. The reception component 1202 may receive communications. The buffer component 1212 may buffer the communications in a buffer at the AS layer. The buffer component 1212 may release the communications from the buffer to an upper protocol layer at a rate of release that is to change between a transition start time and the activation time.

The transition component 1210 may determine the transition start time based at least in part on the indication. The transition component 1210 may determine, based at least in part on the indication, a difference between a first propagation latency before the ISL activation and a second propagation latency after the ISL activation. The transition component 1210 may determine the transition start time based at least in part on the difference. The buffer component 1212 may change the rate of release by changing a timer associated with the buffer.

In some aspects, the transition component 1210 may obtain, at an AS layer, an indication of an ISL deactivation that is to take place at a deactivation time. The buffer component 1212 may buffer communications in a buffer. The buffer component 1212 may release the communications from the buffer at a rate of release that is to change between the deactivation time and a transition end time. The transmission component 1204 may transmit the communications.

The transition component 1210 may determine the transition end time based at least in part on the indication. The transition component 1210 may determine, based at least in part on the indication, a difference between a first propagation latency before the ISL deactivation and a second propagation latency after the ISL deactivation. The transition component 1210 may determine the transition end time based at least in part on the difference. The buffer component 1212 may change the rate of release by changing a timer associated with the buffer.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

Figure 13:
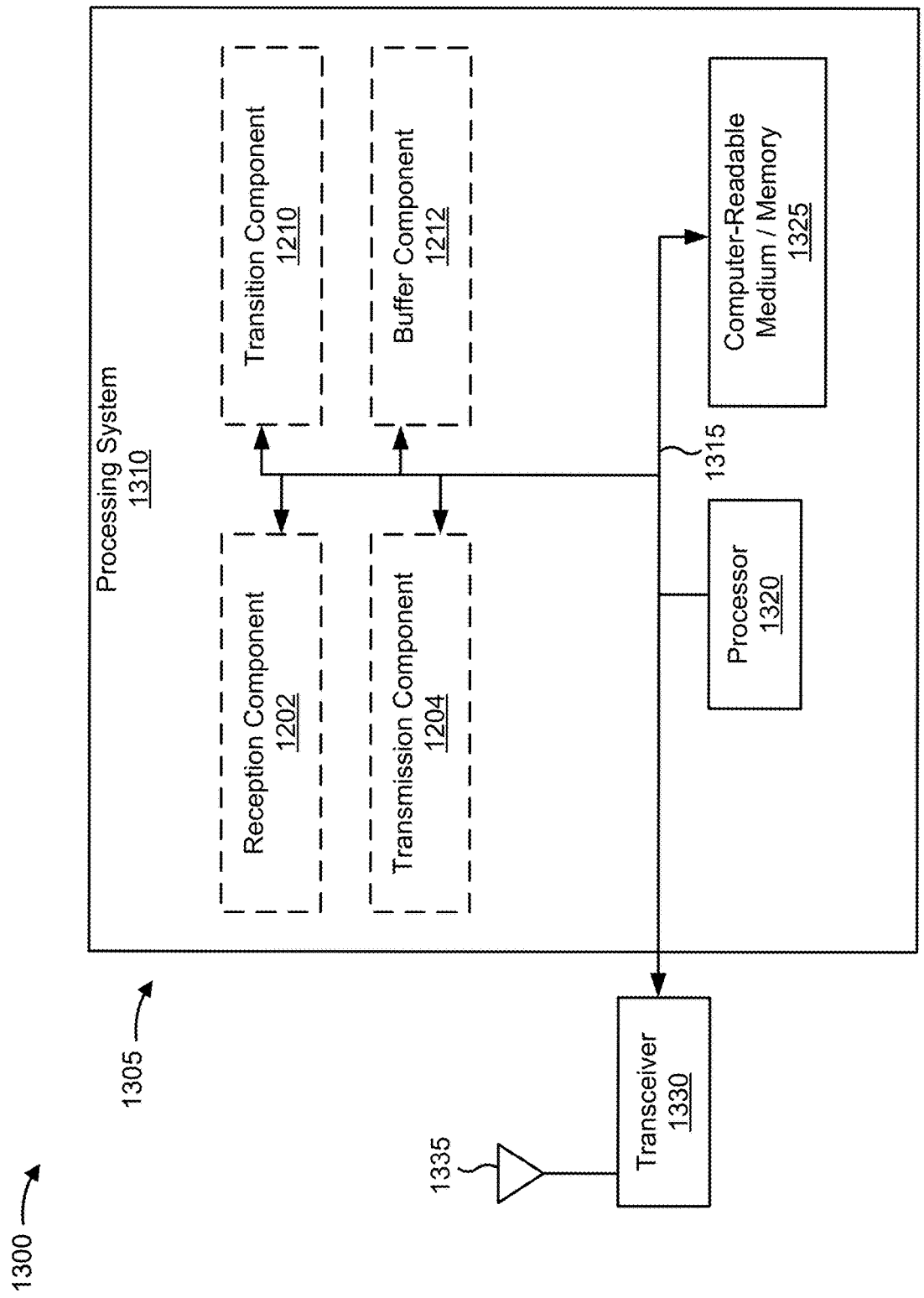
FIG. 13 is a diagram illustrating an example of a hardware implementation for an apparatus employing a processing system, in accordance with the present disclosure.

FIG. 13 is a diagram illustrating an example 1300 of a hardware implementation for an apparatus 1305 employing a processing system 1310, in accordance with the present disclosure. The apparatus 1305 may be a UE.

The processing system 1310 may be implemented with a bus architecture, represented generally by the bus 1315. The bus 1315 may include any number of interconnecting buses and bridges depending on the specific application of the processing system 1310 and the overall design constraints. The bus 1315 links together various circuits including one or more processors and/or hardware components, represented by the processor 1320, the illustrated components, and the computer-readable medium/memory 1325. The bus 1315 may also link various other circuits, such as timing sources, peripherals, voltage regulators, and/or power management circuits.

The processing system 1310 may be coupled to a transceiver 1330. The transceiver 1330 is coupled to one or more antennas 1335. The transceiver 1330 provides a means for communicating with various other apparatuses over a transmission medium. The transceiver 1330 receives a signal from the one or more antennas 1335, extracts information from the received signal, and provides the extracted information to the processing system 1310, specifically the reception component 1202. In addition, the transceiver 1330 receives information from the processing system 1310, specifically the transmission component 1204, and generates a signal to be applied to the one or more antennas 1335 based at least in part on the received information.

The processing system 1310 includes a processor 1320 coupled to a computer-readable medium/memory 1325. The processor 1320 is responsible for general processing, including the execution of software stored on the computer-readable medium/memory 1325. The software, when executed by the processor 1320, causes the processing system 1310 to perform the various functions described herein for any particular apparatus. The computer-readable medium/memory 1325 may also be used for storing data that is manipulated by the processor 1320 when executing software. The processing system further includes at least one of the illustrated components. The components may be software modules running in the processor 1320, resident/stored in the computer readable medium/memory 1325, one or more hardware modules coupled to the processor 1320, or some combination thereof.

In some aspects, the processing system 1310 may be a component of the UE 120 and may include the memory 282 and/or at least one of the TX MIMO processor 266, the receive (RX) processor 258, and/or the controller/processor 280. In some aspects, the apparatus 1305 for wireless communication includes means for obtaining, at an AS layer, an indication of an ISL activation that is to take place at an activation time; means for receiving communications; means for buffering the communications in a buffer at the AS layer; and/or means for releasing the communications from the buffer to an upper protocol layer at a rate of release that is to change between a transition start time and the activation time. In some aspects, the apparatus 1305 for wireless communication includes means for obtaining, at an AS layer, an indication of an ISL deactivation that is to take place at a deactivation time; means for buffering communications in a buffer; means for releasing the communications from the buffer at a rate of release that is to change between the deactivation time and a transition end time; and/or means for transmitting the communications. The aforementioned means may be one or more of the aforementioned components of the apparatus 1200 and/or the processing system 1310 of the apparatus 1305 configured to perform the functions recited by the aforementioned means. As described elsewhere herein, the processing system 1310 may include the TX MIMO processor 266, the RX processor 258, and/or the controller/processor 280. In one configuration, the aforementioned means may be the TX MIMO processor 266, the RX processor 258, and/or the controller/processor 280 configured to perform the functions and/or operations recited herein.

In some aspects, the processing system 1310 may be a component of the base station 110 and may include the memory 242 and/or at least one of the TX MIMO processor 230, the RX processor 238, and/or the controller/processor 240. In some aspects, the apparatus 1305 for wireless communication includes means for obtaining, at an AS layer, an indication of an ISL activation that is to take place at an activation time; means for receiving communications; means for buffering the communications in a buffer at the AS layer; and/or means for releasing the communications from the buffer to an upper protocol layer at a rate of release that is to change between a transition start time and the activation time. In some aspects, the apparatus 1305 for wireless communication includes means for obtaining, at an AS layer, an indication of an ISL deactivation that is to take place at a deactivation time; means for buffering communications in a buffer; means for releasing the communications from the buffer at a rate of release that is to change between the deactivation time and a transition end time; and/or means for transmitting the communications. The aforementioned means may be one or more of the aforementioned components of the apparatus 1200 and/or the processing system 1310 of the apparatus 1305 configured to perform the functions recited by the aforementioned means. As described elsewhere herein, the processing system 1310 may include the TX MIMO processor 230, the receive processor 238, and/or the controller/processor 240. In one configuration, the aforementioned means may be the TX MIMO processor 230, the receive processor 238, and/or the controller/processor 240 configured to perform the functions and/or operations recited herein.

FIG. 13 is provided as an example. Other examples may differ from what is described in connection with FIG. 13.

Figure 14:
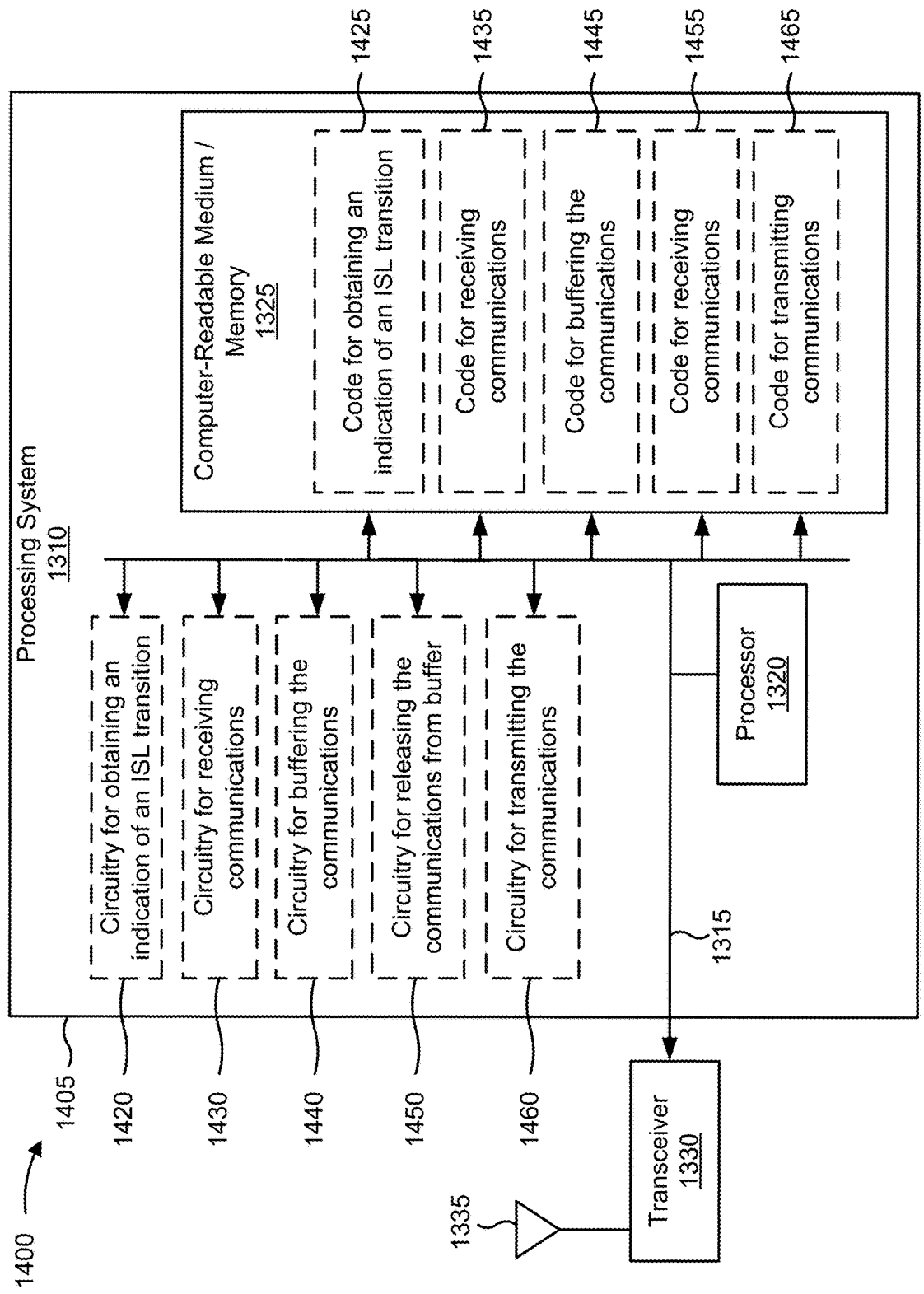
FIG. 14 is a diagram illustrating an example of an implementation of code and circuitry for an apparatus, in accordance with the present disclosure.

FIG. 14 is a diagram illustrating an example 1400 of an implementation of code and circuitry for an apparatus 1405, in accordance with the present disclosure. The apparatus 1405 may be a UE, or a UE may include the apparatus 1405.

As shown in FIG. 14, the apparatus 1405 may include circuitry for obtaining, at an AS layer, an indication of an ISL transition (e.g., activation that is to take place at an activation time) (circuitry 1420). For example, the circuitry 1420 may enable the apparatus 1405 to obtain, at an AS layer, an indication of an ISL activation that is to take place at an activation time.

As shown in FIG. 14, the apparatus 1405 may include, stored in computer-readable medium 1325, code for obtaining, at an AS layer, an indication of an ISL transition (e.g., activation that is to take place at an activation time) (code 1425). For example, the code 1425, when executed by processor 1320, may cause processor 1320 to cause transceiver 1330 to obtain, at an AS layer, an indication of an ISL activation that is to take place at an activation time.

As shown in FIG. 14, the apparatus 1405 may include circuitry for receiving communications (circuitry 1430). For example, the circuitry 1430 may enable the apparatus 1405 to receive communications.

As shown in FIG. 14, the apparatus 1405 may include, stored in computer-readable medium 1325, code for receiving communications (code 1435). For example, the code 1435, when executed by processor 1320, may cause processor 1320 to cause transceiver 1330 to receive communications.

As shown in FIG. 14, the apparatus 1405 may include circuitry for buffering the communications in a buffer at the AS layer (circuitry 1440). For example, the circuitry 1440 may enable the apparatus 1405 to buffer the communications in a buffer at the AS layer.

As shown in FIG. 14, the apparatus 1405 may include, stored in computer-readable medium 1325, code for buffering the communications in a buffer at the AS layer (code 1445). For example, the code 1445, when executed by processor 1320, may cause processor 1320 to buffer the communications in a buffer at the AS layer.

As shown in FIG. 14, the apparatus 1405 may include circuitry for releasing the communications from the buffer to an upper protocol layer at a rate of release that changes between a transition start time and the activation time (circuitry 1450). For example, the circuitry 1450 may enable the apparatus 1405 to release the communications from the buffer to an upper protocol layer at a rate of release that changes between a transition start time and the activation time.

As shown in FIG. 14, the apparatus 1405 may include, stored in computer-readable medium 1325, code for releasing the communications from the buffer to an upper protocol layer at a rate of release that changes between a transition start time and the activation time (code 1455). For example, the code 1455, when executed by processor 1320, may cause processor 1320 to release the communications from the buffer to an upper protocol layer at a rate of release that changes between a transition start time and the activation time.

In some aspects, the apparatus 1405 may include circuitry for obtaining, at an AS layer, an indication of an ISL transition (e.g., deactivation that is to take place at a deactivation time) (circuitry 1420). For example, the circuitry 1420 may enable the apparatus 1405 to obtain, at an AS layer, an indication of an ISL deactivation that is to take place at a deactivation time.

As shown in FIG. 14, the apparatus 1405 may include, stored in computer-readable medium 1325, code for obtaining, at an AS layer, an indication of an ISL transition (e.g., deactivation that is to take place at a deactivation time) (code 1425). For example, the code 1425, when executed by processor 1320, may cause processor 1320 to cause transceiver 1330 to obtain, at an AS layer, an indication of an ISL transition (e.g., deactivation that is to take place at a deactivation time).

As shown in FIG. 14, the apparatus 1405 may include circuitry for buffering communications in a buffer (circuitry 1440). For example, the circuitry 1430 may enable the apparatus 1405 to buffer communications in a buffer.

As shown in FIG. 14, the apparatus 1405 may include, stored in computer-readable medium 1325, code for buffering communications in a buffer (code 1445). For example, the code 1435, when executed by processor 1320, may cause processor 1320 to buffer communications in a buffer.

As shown in FIG. 14, the apparatus 1405 may include circuitry for releasing the communications from the buffer at a rate of release that changes between the deactivation time and a transition end time (circuitry 1450). For example, the circuitry 1440 may enable the apparatus 1405 to release the communications from the buffer at a rate of release that changes between the deactivation time and a transition end time.

As shown in FIG. 14, the apparatus 1405 may include, stored in computer-readable medium 1325, code for releasing the communications from the buffer at a rate of release that changes between the deactivation time and a transition end time (code 1455). For example, the code 1445, when executed by processor 1320, may cause processor 1320 to release the communications from the buffer at a rate of release that changes between the deactivation time and a transition end time.

As shown in FIG. 14, the apparatus 1405 may include circuitry for transmitting the communications (circuitry 1460). For example, the circuitry 1450 may enable the apparatus 1405 to transmit the communications.

As shown in FIG. 14, the apparatus 1405 may include, stored in computer-readable medium 1325, code for transmitting the communications (code 1465). For example, the code 1455, when executed by processor 1320, may cause processor 1320 to cause transceiver 1330 to transmit the communications.

FIG. 14 is provided as an example. Other examples may differ from what is described in connection with FIG. 14.

Figure 15:
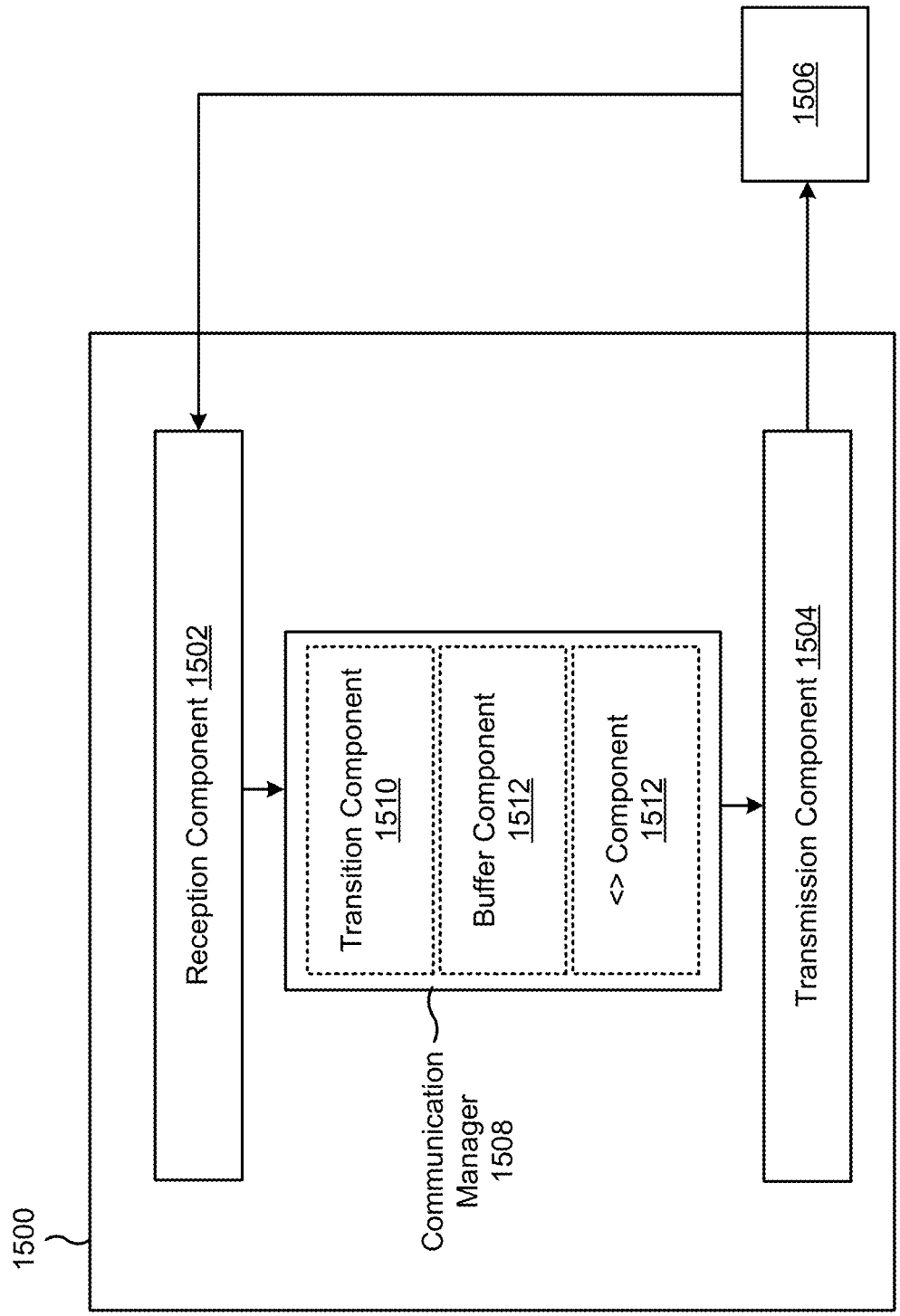
FIG. 15 is a diagram of an example apparatus for wireless communication, in accordance with the present disclosure.

FIG. 15 is a diagram of an example apparatus 1500 for wireless communication, in accordance with the present disclosure. The apparatus 1500 may be a network entity (e.g., base station 110, gateway 450, satellite 440, satellite 490), or a network entity may include the apparatus 1500. In some aspects, the apparatus 1500 includes a reception component 1502 and a transmission component 1504, which may be in communication with one another (for example, via one or more buses and/or one or more other components). As shown, the apparatus 1500 may communicate with another apparatus 1506 (such as a UE, a base station, or another wireless communication device) using the reception component 1502 and the transmission component 1504. As further shown, the apparatus 1500 may include the communication manager 1508. The communication manager 1508 may control and/or otherwise manage one or more operations of the reception component 1502 and/or the transmission component 1504. In some aspects, the communication manager 1508 may include one or more antennas, a modem, a controller/processor, a memory, or a combination thereof, of the network entity described in connection with FIG. 2. The communication manager 1508 may be, or be similar to, the communication manager 150 depicted in FIGS. 1 and 2. For example, in some aspects, the communication manager 1508 may be configured to perform one or more of the functions described as being performed by the communication manager 150. In some aspects, the communication manager 1508 may include the reception component 1502 and/or the transmission component 1504. The communication manager 1508 may include a transition component 1510 and/or a buffer component 1512, among other examples.

In some aspects, the apparatus 1500 may be configured to perform one or more operations described herein in connection with FIGS. 1-9. Additionally, or alternatively, the apparatus 1500 may be configured to perform one or more processes described herein, such as process 1000 of FIG. 10, process 1100 of FIG. 11, or a combination thereof. In some aspects, the apparatus 1500 and/or one or more components shown in FIG. 15 may include one or more components of the network entity described in connection with FIG. 2. Additionally, or alternatively, one or more components shown in FIG. 15 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1502 may receive communications, such as reference signals, control information, data communications, or a combination thereof, from the apparatus 1506. The reception component 1502 may provide received communications to one or more other components of the apparatus 1500. In some aspects, the reception component 1502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1500. In some aspects, the reception component 1502 may include one or more antennas, a modem, a demodulator, a MIMO detector, a receive processor, a controller/processor, a memory, or a combination thereof, of the network entity described in connection with FIG. 2.

The transmission component 1504 may transmit communications, such as reference signals, control information, data communications, or a combination thereof, to the apparatus 1506. In some aspects, one or more other components of the apparatus 1500 may generate communications and may provide the generated communications to the transmission component 1504 for transmission to the apparatus 1506. In some aspects, the transmission component 1504 may perform signal processing on the generated communications (such as filtering, amplification, modulation, digital-to-analog conversion, multiplexing, interleaving, mapping, or encoding, among other examples), and may transmit the processed signals to the apparatus 1506. In some aspects, the transmission component 1504 may include one or more antennas, a modem, a modulator, a transmit MIMO processor, a transmit processor, a controller/processor, a memory, or a combination thereof, of the network entity described in connection with FIG. 2. In some aspects, the transmission component 1504 may be co-located with the reception component 1502 in a transceiver.

In some aspects, the transition component 1510 may obtain, at an AS layer, an indication of an ISL activation that is to take place at an activation time. The reception component 1502 may receive communications. The buffer component 1512 may buffer the communications in a buffer at the AS layer. The buffer component 1512 may release the communications from the buffer to an upper protocol layer at a rate of release that changes between a transition start time and the activation time.

The transition component 1510 may determine the transition start time based at least in part on the indication. The transition component 1510 may determine, based at least in part on the indication, a difference between a first propagation latency before the ISL activation and a second propagation latency after the ISL activation. The transition component 1510 may determine the transition start time based at least in part on the difference. The buffer component 1512 may change the rate of release by changing a timer associated with the buffer.

In some aspects, the transition component 1510 may obtain, at an AS layer, an indication of an ISL deactivation that is to take place at a deactivation time. The buffer component 1512 may buffer communications in a buffer. The buffer component 1512 may release the communications from the buffer at a rate of release that changes between the deactivation time and a transition end time. The transmission component 1504 may transmit the communications.

The transition component 1510 may determine the transition end time based at least in part on the indication. The transition component 1510 may determine, based at least in part on the indication, a difference between a first propagation latency before the ISL deactivation and a second propagation latency after the ISL deactivation. The transition component 1510 may determine the transition end time based at least in part on the difference. The buffer component 1512 may change the rate of release by changing a timer associated with the buffer.

The number and arrangement of components shown in FIG. 15 are provided as an example. In practice, there may be additional components, fewer components, different components, or differently arranged components than those shown in FIG. 15. Furthermore, two or more components shown in FIG. 15 may be implemented within a single component, or a single component shown in FIG. 15 may be implemented as multiple, distributed components. Additionally, or alternatively, a set of (one or more) components shown in FIG. 15 may perform one or more functions described as being performed by another set of components shown in FIG. 15.

Figure 16:
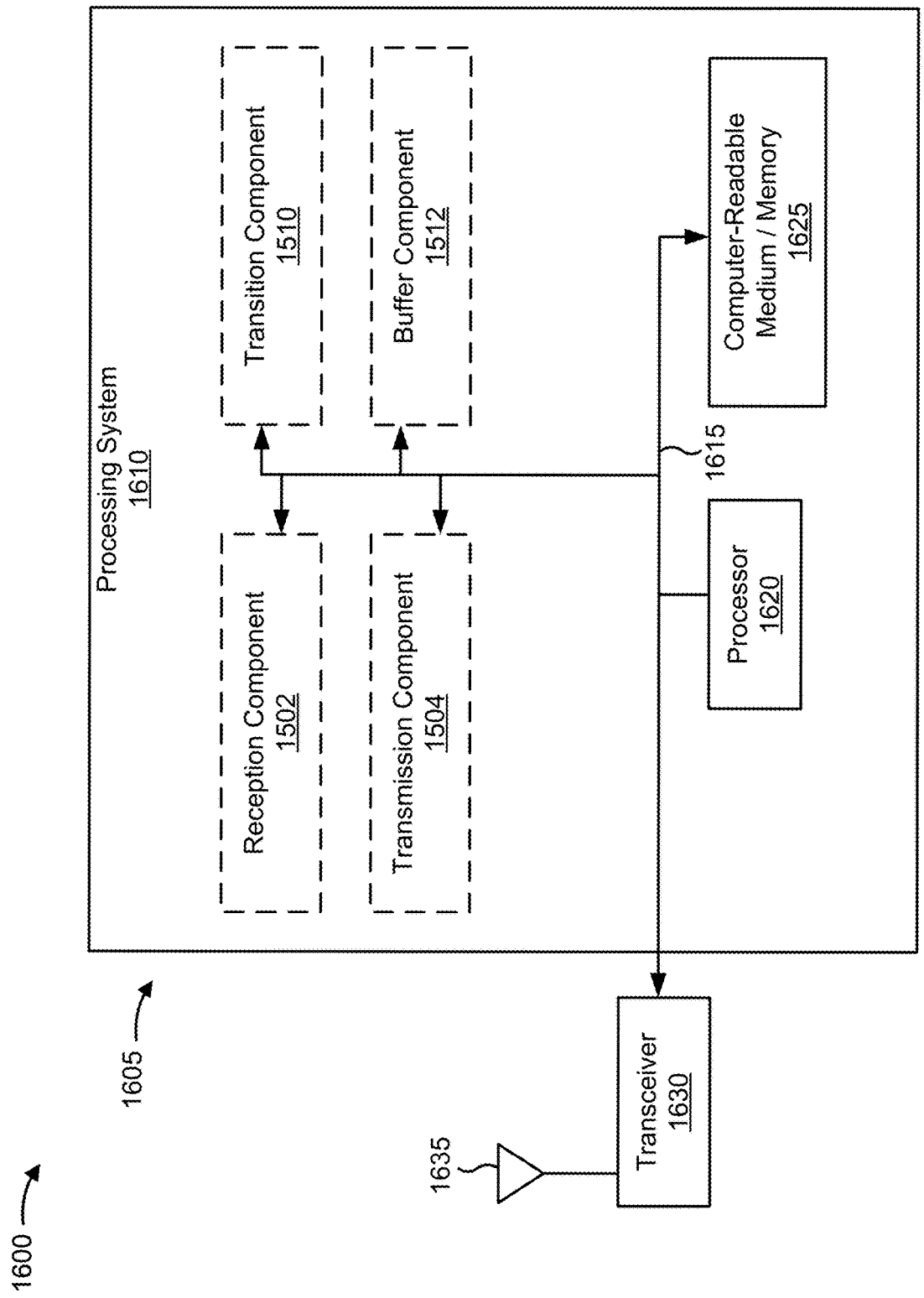
FIG. 16 is a diagram illustrating an example of a hardware implementation for an apparatus employing a processing system, in accordance with the present disclosure.

FIG. 16 is a diagram illustrating an example 1600 of a hardware implementation for an apparatus 1605 employing a processing system 1610, in accordance with the present disclosure. The apparatus 1605 may be a network entity.

The processing system 1610 may be implemented with a bus architecture, represented generally by the bus 1615. The bus 1615 may include any number of interconnecting buses and bridges depending on the specific application of the processing system 1610 and the overall design constraints. The bus 1615 links together various circuits including one or more processors and/or hardware components, represented by the processor 1620, the illustrated components, and the computer-readable medium/memory 1625. The bus 1615 may also link various other circuits, such as timing sources, peripherals, voltage regulators, and/or power management circuits.

The processing system 1610 may be coupled to a transceiver 1630. The transceiver 1630 is coupled to one or more antennas 1635. The transceiver 1630 provides a means for communicating with various other apparatuses over a transmission medium. The transceiver 1630 receives a signal from the one or more antennas 1635, extracts information from the received signal, and provides the extracted information to the processing system 1610, specifically the reception component 1502. In addition, the transceiver 1630 receives information from the processing system 1610, specifically the transmission component 1504, and generates a signal to be applied to the one or more antennas 1635 based at least in part on the received information.

The processing system 1610 includes a processor 1620 coupled to a computer-readable medium/memory 1625. The processor 1620 is responsible for general processing, including the execution of software stored on the computer-readable medium/memory 1625. The software, when executed by the processor 1620, causes the processing system 1610 to perform the various functions described herein for any particular apparatus. The computer-readable medium/memory 1625 may also be used for storing data that is manipulated by the processor 1620 when executing software. The processing system further includes at least one of the illustrated components. The components may be software modules running in the processor 1620, resident/stored in the computer readable medium/memory 1625, one or more hardware modules coupled to the processor 1620, or some combination thereof.

In some aspects, the processing system 1610 may be a component of the UE 120 and may include the memory 282 and/or at least one of the TX MIMO processor 266, the RX processor 258, and/or the controller/processor 280. In some aspects, the apparatus 1605 for wireless communication includes means for obtaining, at an AS layer, an indication of an ISL activation that is to take place at an activation time; means for receiving communications; means for buffering the communications in a buffer at the AS layer; and/or means for releasing the communications from the buffer to an upper protocol layer at a rate of release that changes between a transition start time and the activation time. In some aspects, the apparatus 1605 for wireless communication includes means for obtaining, at an AS layer, an indication of an ISL deactivation that is to take place at a deactivation time; means for buffering communications in a buffer; means for releasing the communications from the buffer at a rate of release that changes between the deactivation time and a transition end time; and/or means for transmitting the communications. The aforementioned means may be one or more of the aforementioned components of the apparatus 1500 and/or the processing system 1610 of the apparatus 1605 configured to perform the functions recited by the aforementioned means. As described elsewhere herein, the processing system 1610 may include the TX MIMO processor 266, the RX processor 258, and/or the controller/processor 280. In one configuration, the aforementioned means may be the TX MIMO processor 266, the RX processor 258, and/or the controller/processor 280 configured to perform the functions and/or operations recited herein.

In some aspects, the processing system 1610 may be a component of the base station 110 and may include the memory 242 and/or at least one of the TX MIMO processor 230, the RX processor 238, and/or the controller/processor 240. In some aspects, the apparatus 1605 for wireless communication includes means for obtaining, at an AS layer, an indication of an ISL activation that is to take place at an activation time; means for receiving communications; means for buffering the communications in a buffer at the AS layer; and/or means for releasing the communications from the buffer to an upper protocol layer at a rate of release that changes between a transition start time and the activation time. In some aspects, the apparatus 1605 for wireless communication includes means for obtaining, at an AS layer, an indication of an ISL deactivation that is to take place at a deactivation time; means for buffering communications in a buffer; means for releasing the communications from the buffer at a rate of release that changes between the deactivation time and a transition end time; and/or means for transmitting the communications. The aforementioned means may be one or more of the aforementioned components of the apparatus 1500 and/or the processing system 1610 of the apparatus 1605 configured to perform the functions recited by the aforementioned means. As described elsewhere herein, the processing system 1610 may include the TX MIMO processor 230, the receive processor 238, and/or the controller/processor 240. In one configuration, the aforementioned means may be the TX MIMO processor 230, the receive processor 238, and/or the controller/processor 240 configured to perform the functions and/or operations recited herein.

FIG. 16 is provided as an example. Other examples may differ from what is described in connection with FIG. 16.

Figure 17:
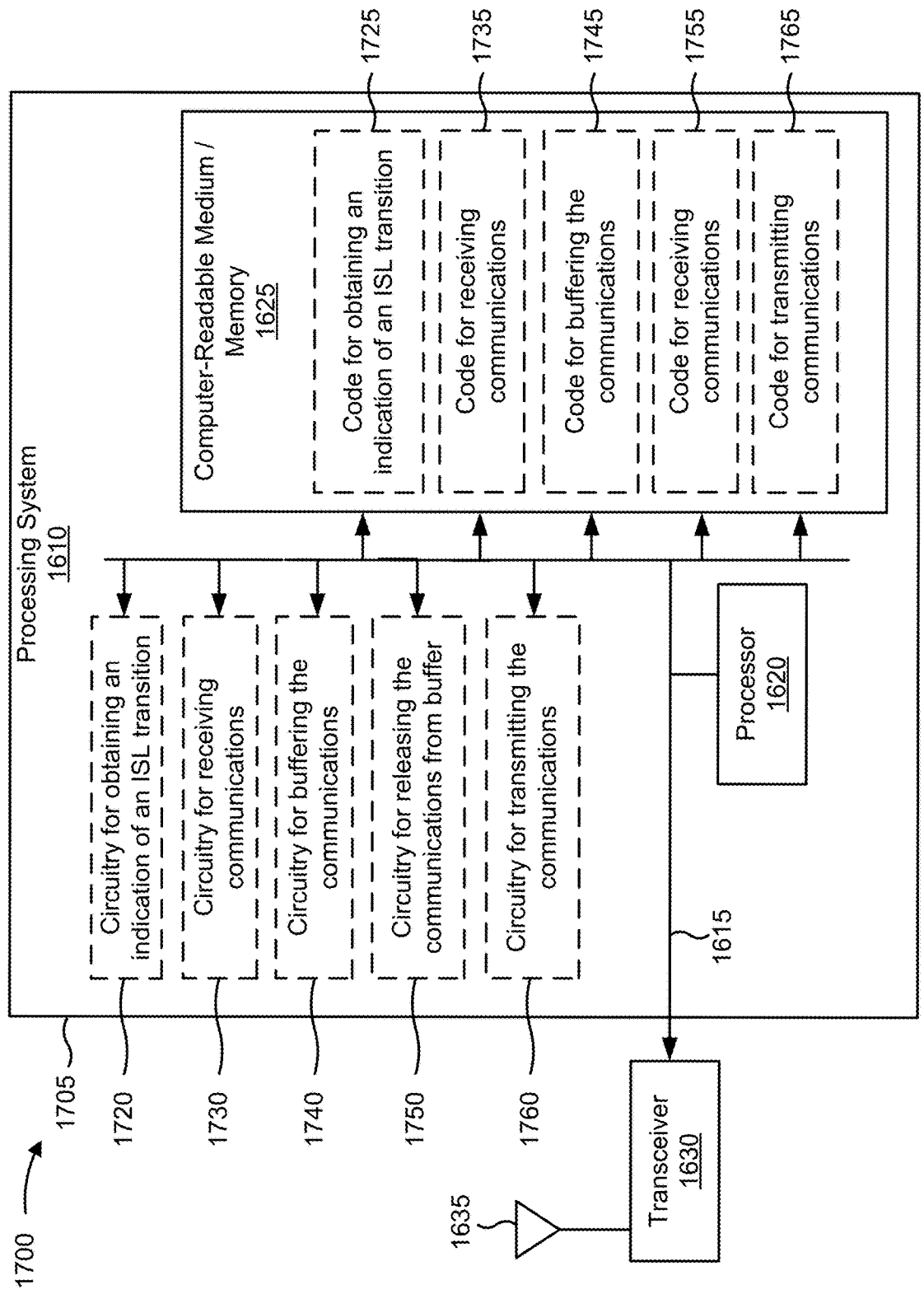
FIG. 17 is a diagram illustrating an example of an implementation of code and circuitry for an apparatus, in accordance with the present disclosure.

FIG. 17 is a diagram illustrating an example 1700 of an implementation of code and circuitry for an apparatus 1705, in accordance with the present disclosure. The apparatus 1705 may be a network entity, or a network entity may include the apparatus 1705.

As shown in FIG. 17, the apparatus 1705 may include circuitry for obtaining, at an AS layer, an indication of an ISL transition (e.g., activation that is to take place at an activation time) (circuitry 1720). For example, the circuitry 1720 may enable the apparatus 1705 to obtain, at an AS layer, an indication of an ISL activation that is to take place at an activation time.

As shown in FIG. 17, the apparatus 1705 may include, stored in computer-readable medium 1625, code for obtaining, at an AS layer, an indication of an ISL transition (e.g., activation that is to take place at an activation time) (code 1725). For example, the code 1725, when executed by processor 1620, may cause processor 1620 to cause transceiver 1630 to obtain, at an AS layer, an indication of an ISL activation that is to take place at an activation time.

As shown in FIG. 17, the apparatus 1705 may include circuitry for receiving communications (circuitry 1730). For example, the circuitry 1730 may enable the apparatus 1705 to receive communications.

As shown in FIG. 17, the apparatus 1705 may include, stored in computer-readable medium 1625, code for receiving communications (code 1735). For example, the code 1735, when executed by processor 1620, may cause processor 1620 to cause transceiver 1630 to receive communications.

As shown in FIG. 17, the apparatus 1705 may include circuitry for buffering the communications in a buffer at the AS layer (circuitry 1740). For example, the circuitry 1740 may enable the apparatus 1705 to buffer the communications in a buffer at the AS layer.

As shown in FIG. 17, the apparatus 1705 may include, stored in computer-readable medium 1625, code for buffering the communications in a buffer at the AS layer (code 1745). For example, the code 1745, when executed by processor 1620, may cause processor 1620 to buffer the communications in a buffer at the AS layer.

As shown in FIG. 17, the apparatus 1705 may include circuitry for releasing the communications from the buffer to an upper protocol layer at a rate of release that changes between a transition start time and the activation time (circuitry 1750). For example, the circuitry 1750 may enable the apparatus 1705 to release the communications from the buffer to an upper protocol layer at a rate of release that changes between a transition start time and the activation time.

As shown in FIG. 17, the apparatus 1705 may include, stored in computer-readable medium 1625, code for releasing the communications from the buffer to an upper protocol layer at a rate of release that changes between a transition start time and the activation time (code 1755). For example, the code 1755, when executed by processor 1620, may cause processor 1620 to release the communications from the buffer to an upper protocol layer at a rate of release that changes between a transition start time and the activation time.

In some aspects, the apparatus 1705 may be a network entity, or a network entity may include the apparatus 1705.

As shown in FIG. 17, the apparatus 1705 may include circuitry for obtaining, at an AS layer, an indication of an ISL transition (e.g., deactivation that is to take place at a deactivation time) (circuitry 1720). For example, the circuitry 1720 may enable the apparatus 1705 to obtain, at an AS layer, an indication of an ISL deactivation that is to take place at a deactivation time.

As shown in FIG. 17, the apparatus 1705 may include, stored in computer-readable medium 1625, code for obtaining, at an AS layer, an indication of an ISL transition (e.g., deactivation that is to take place at a deactivation time) (code 1725). For example, the code 1725, when executed by processor 1620, may cause processor 1620 to cause transceiver 1630 to obtain, at an AS layer, an indication of an ISL transition (e.g., deactivation that is to take place at a deactivation time).

As shown in FIG. 17, the apparatus 1705 may include circuitry for buffering communications in a buffer (circuitry 1740). For example, the circuitry 1730 may enable the apparatus 1705 to buffer communications in a buffer.

As shown in FIG. 17, the apparatus 1705 may include, stored in computer-readable medium 1625, code for buffering communications in a buffer (code 1745). For example, the code 1735, when executed by processor 1620, may cause processor 1620 to buffer communications in a buffer.

As shown in FIG. 17, the apparatus 1705 may include circuitry for releasing the communications from the buffer at a rate of release that changes between the deactivation time and a transition end time (circuitry 1750). For example, the circuitry 1740 may enable the apparatus 1705 to release the communications from the buffer at a rate of release that changes between the deactivation time and a transition end time.

As shown in FIG. 17, the apparatus 1705 may include, stored in computer-readable medium 1625, code for releasing the communications from the buffer at a rate of release that changes between the deactivation time and a transition end time (code 1755). For example, the code 1745, when executed by processor 1620, may cause processor 1620 to release the communications from the buffer at a rate of release that changes between the deactivation time and a transition end time.

As shown in FIG. 17, the apparatus 1705 may include circuitry for transmitting the communications (circuitry 1760). For example, the circuitry 1750 may enable the apparatus 1705 to transmit the communications.

As shown in FIG. 17, the apparatus 1705 may include, stored in computer-readable medium 1625, code for transmitting the communications (code 1765). For example, the code 1755, when executed by processor 1620, may cause processor 1620 to cause transceiver 1630 to transmit the communications.

FIG. 17 is provided as an example. Other examples may differ from what is described in connection with FIG. 17.

The following provides an overview of some Aspects of the present disclosure:

Aspect 1: A method of wireless communication performed by a wireless communication device, comprising: obtaining, at an access stratum (AS) layer, an indication of an inter-satellite link (ISL) activation that is to take place at an activation time; receiving communications; buffering the communications in a buffer at the AS layer; and releasing the communications from the buffer to an upper protocol layer at a rate of release that changes between a transition start time and the activation time.

Aspect 2: The method of Aspect 1, wherein obtaining the indication includes receiving the indication.

Aspect 3: The method of Aspect 1 or 2, further comprising determining the transition start time based at least in part on the indication.

Aspect 4: The method of any of Aspects 1-3, further comprising determining, based at least in part on the indication, a difference between a first propagation latency before the ISL activation and a second propagation latency after the ISL activation.

Aspect 5: The method of Aspect 4, further comprising determining the transition start time based at least in part on the difference.

Aspect 6: The method of Aspect 4 or 5, wherein a rate of buffering or the rate of release changes based at least in part on the difference satisfying a threshold.

Aspect 7: The method of any of Aspects 4-6, wherein the rate of release increases in response to the second propagation latency being greater than the first propagation latency.

Aspect 8: The method of any of Aspects 4-6, wherein the rate of release decreases in response to the second propagation latency being less than the first propagation latency.

Aspect 9: The method of any of Aspects 1-8, wherein a rate of buffering or the rate of release changes based at least in part on a configured function.

Aspect 10: The method of Aspect 9, wherein the configured function is a linear function.

Aspect 11: The method of Aspect 9, wherein the configured function is a non-linear function.

Aspect 12: The method of Aspect 9, wherein the configured function is a stepped function.

Aspect 13: The method of any of Aspects 1-12, further comprising changing the rate of release by changing a timer associated with the buffer.

Aspect 14: The method of any of Aspects 1-13, wherein a rate of buffering or the rate of release changes based at least in part on a latency sensitivity of a service or quality of service flow.

Aspect 15: The method of any of Aspects 1-4, wherein buffering the communications includes buffering the communications using a buffer that is activated based at least in part on receiving the indication of the ISL activation.

Aspect 16: The method of any of Aspects 1-15, wherein the wireless communication device is a user equipment.

Aspect 17: The method of any of Aspects 1-15, wherein the wireless communication device is a network entity.

Aspect 18: A method of wireless communication performed by a user equipment (UE), comprising: obtaining, at an access stratum (AS) layer, an indication of an inter-satellite link (ISL) deactivation that is to take place at a deactivation time; buffering communications in a buffer; releasing the communications from the buffer at a rate of release that changes between the deactivation time and a transition end time; and transmitting the communications.

Aspect 19: The method of Aspect 18, further comprising determining the transition end time based at least in part on the indication.

Aspect 20: The method of Aspect 18 or 19, further comprising determining, based at least in part on the indication, a difference between a first propagation latency before the ISL deactivation and a second propagation latency after the ISL deactivation.

Aspect 21: The method of Aspect 20, further comprising determining the transition end time based at least in part on the difference.

Aspect 22: The method of Aspect 20 or 21, wherein a rate of buffering or the rate of release changes based at least in part on the difference satisfying a threshold.

Aspect 23: The method of any of Aspects 20-22, wherein a rate of buffering or the rate of release changes based at least in part on a configured function.

Aspect 24: The method of any of Aspects 20-23, further comprising changing the rate of release by changing a timer associated with the buffer.

Aspect 25: The method of any of Aspects 18-24, wherein a rate of buffering or the rate of release changes based at least in part on a latency sensitivity of a service or quality of service flow.

Aspect 26: An apparatus for wireless communication at a device, comprising a processor; memory coupled with the processor; and instructions stored in the memory and executable by the processor to cause the apparatus to perform the method of one or more of Aspects 1-25.

Aspect 27: A device for wireless communication, comprising a memory and one or more processors coupled to the memory, the one or more processors configured to perform the method of one or more of Aspects 1-25.

Aspect 28: An apparatus for wireless communication, comprising at least one means for performing the method of one or more of Aspects 1-25.

Aspect 29: A non-transitory computer-readable medium storing code for wireless communication, the code comprising instructions executable by a processor to perform the method of one or more of Aspects 1-25.

Aspect 30: A non-transitory computer-readable medium storing a set of instructions for wireless communication, the set of instructions comprising one or more instructions that, when executed by one or more processors of a device, cause the device to perform the method of one or more of Aspects 1-25.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A wireless communication device for wireless communication, comprising:
   a memory; and
   one or more processors, coupled to the memory, configured to:
      obtain, at an access stratum (AS) layer, an indication of an inter-satellite link (ISL) activation that is to take place at an ISL activation time;
      receive communications;
      buffer the communications in a buffer at the AS layer; and
      release the communications from the buffer to an upper protocol layer at a rate of release that is to change between a transition start time and the ISL activation time, wherein a transition that starts at the transition start time is associated with a latency change from a first propagation latency before the ISL activation to a second propagation latency after the ISL activation.

2. The wireless communication device of claim 1, wherein the one or more processors, to obtain the indication, are configured to receive the indication.

3. The wireless communication device of claim 1, wherein the one or more processors are further configured to determine the transition start time based at least in part on the indication.

4. The wireless communication device of claim 1, wherein the one or more processors are further configured to determine, based at least in part on the indication, a difference between the first propagation latency before the ISL activation and the second propagation latency after the ISL activation.

5. The wireless communication device of claim 4, wherein the one or more processors are further configured to determine the transition start time based at least in part on the difference.

6. The wireless communication device of claim 4, wherein a rate of buffering or the rate of release changes based at least in part on whether the difference satisfies a threshold.

7. The wireless communication device of claim 4, wherein the rate of release increases when the second propagation latency is greater than the first propagation latency.

8. The wireless communication device of claim 4, wherein the rate of release decreases when the second propagation latency is less than the first propagation latency.

9. The wireless communication device of claim 1, wherein a rate of buffering or the rate of release changes based at least in part on a configured function.

10. The wireless communication device of claim 9, wherein the configured function is a linear function.

11. The wireless communication device of claim 9, wherein the configured function is a non-linear function.

12. The wireless communication device of claim 9, wherein the configured function is a stepped function.

13. The wireless communication device of claim 1, wherein the one or more processors are further configured to change a time associated with the buffer to change the rate of release.

14. The wireless communication device of claim 1, wherein a rate of buffering or the rate of release changes based at least in part on a latency sensitivity of a service or quality of service flow.

15. The wireless communication device of claim 1, wherein the one or more processors, to buffer the communications, are configured to buffer the communications via a buffer that is activated based at least in part on the indication of the ISL activation.

16. The wireless communication device of claim 1, wherein the wireless communication device is a user equipment.

17. The wireless communication device of claim 1, wherein the wireless communication device is a network entity.

18. A wireless communication device for wireless communication, comprising:
a memory; and
one or more processors, coupled to the memory, configured to:
obtain, at an access stratum (AS) layer, an indication of an inter-satellite link (ISL) deactivation that is to take place at an ISL deactivation time;
buffer communications in a buffer;
release the communications from the buffer at a rate of release that is to change between the ISL deactivation time and a transition end time, wherein a transition that ends at the transition end time is associated with a latency change from a first propagation latency before the ISL deactivation to a second propagation latency after the ISL deactivation; and
transmit the communications.

19. The wireless communication device of claim 18, wherein the one or more processors are further configured to determine the transition end time based at least in part on the indication.

20. The wireless communication device of claim 18, wherein the one or more processors are further configured to determine, based at least in part on the indication, a difference between the first propagation latency before the ISL deactivation and the second propagation latency after the ISL deactivation.

21. The wireless communication device of claim 20, wherein the one or more processors are further configured to determine the transition end time based at least in part on the difference.

22. The wireless communication device of claim 20, wherein a rate of buffering or the rate of release changes based at least in part on whether the difference satisfies a threshold.

23. The wireless communication device of claim 20, wherein a rate of buffering or the rate of release changes based at least in part on a configured function.

24. The wireless communication device of claim 20, wherein the one or more processors are further configured to change a time associated with the buffer to change the rate of release.

25. The wireless communication device of claim 18, wherein a rate of buffering or the rate of release changes based at least in part on a latency sensitivity of a service or quality of service flow.

26. A method of wireless communication performed at a wireless communication device, comprising:
obtaining, at an access stratum (AS) layer, an indication of an inter-satellite link (ISL) activation that is to take place at an ISL activation time;
receiving communications;
buffering the communications in a buffer at the AS layer; and
releasing the communications from the buffer to an upper protocol layer at a rate of release that changes between a transition start time and the ISL activation time, wherein a transition that starts at the transition start time is associated with a latency change from a first propagation latency before the ISL activation to a second propagation latency after the ISL activation.

27. The method of claim 26, further comprising determining the transition start time based at least in part on the indication.

28. The method of claim 26, wherein a rate of buffering or the rate of release changes based at least in part on a configured function.

29. A method of wireless communication performed at a wireless communication device, comprising:
obtaining, at an access stratum (AS) layer, an indication of an inter-satellite link (ISL) deactivation that is to take place at an ISL deactivation time;
buffering communications in a buffer;
releasing the communications from the buffer at a rate of release that changes between the ISL deactivation time and a transition end time, wherein a transition that ends at the transition end time is associated with a latency change from a first propagation latency before the ISL deactivation to a second propagation latency after the ISL deactivation; and
transmitting the communications.

30. The method of claim 29, further comprising determining the transition end time based at least in part on the indication.

31. A non-transitory computer-readable medium storing a set of instructions for wireless communication, the set of instructions comprising:
one or more instructions that, when executed by one or more processors of a wireless communication device, cause the wireless communication device to:
obtain, at an access stratum (AS) layer, an indication of an inter-satellite link (ISL) activation that is to take place at an ISL activation time;
receive communications;
buffer the communications in a buffer at the AS layer; and
release the communications from the buffer to an upper protocol layer at a rate of release that is to change between a transition start time and the ISL activation time, wherein a transition that starts at the transition start time is associated with a latency change from a first propagation latency before the ISL activation to a second propagation latency after the ISL activation.

32. A non-transitory computer-readable medium storing a set of instructions for wireless communication, the set of instructions comprising:
one or more instructions that, when executed by one or more processors of a wireless communication device, cause the wireless communication device to:
obtain, at an access stratum (AS) layer, an indication of an inter-satellite link (ISL) deactivation that is to take place at an ISL deactivation time;
buffer communications in a buffer;
release the communications from the buffer at a rate of release that is to change between the ISL deactivation time and a transition end time, wherein a transition that ends at the transition end time is associated with a latency change from a first propagation latency before the ISL deactivation to a second propagation latency after the ISL deactivation; and
transmit the communications.

* * * * *